(12) United States Patent
Zhou et al.

(10) Patent No.: US 12,559,268 B2
(45) Date of Patent: Feb. 24, 2026

(54) SMART LANDING PLATFORM WITH DATA-DRIVEN ANALYTIC PROCEDURES FOR UNMANNED AERIAL VEHICLE PRE-FLIGHT DIAGNOSIS

(71) Applicant: WAYNE STATE UNIVERSITY, Detroit, MI (US)

(72) Inventors: Zhenyu Zhou, Detroit, MI (US); Yanchao Liu, Troy, MI (US)

(73) Assignee: Wayne State University, Detroit, MI (US)

( * ) Notice: Subject to any disclaimer, the term of this patent is extended or adjusted under 35 U.S.C. 154(b) by 93 days.

(21) Appl. No.: 18/696,243

(22) PCT Filed: Sep. 29, 2022

(86) PCT No.: PCT/US2022/045151
§ 371 (c)(1),
(2) Date: Mar. 27, 2024

(87) PCT Pub. No.: WO2023/055878
PCT Pub. Date: Apr. 6, 2023

(65) Prior Publication Data
US 2024/0400242 A1     Dec. 5, 2024

Related U.S. Application Data

(60) Provisional application No. 63/249,752, filed on Sep. 29, 2021.

(51) Int. Cl.
B64U 70/90     (2023.01)
B64F 5/60     (2017.01)
(Continued)

(52) U.S. Cl.
CPC ................ B64U 70/90 (2023.01); B64F 5/60 (2017.01); B64U 80/25 (2023.01); B64U 10/13 (2023.01)

(58) Field of Classification Search
CPC ........ B64U 70/90; B64U 80/25; B64U 10/13; B64U 70/92; B64F 5/60
(Continued)

(56) References Cited

U.S. PATENT DOCUMENTS 9,540,121 B2 *  1/2017  Byers ................. G06Q 10/0832
2016/0244187 A1 *  8/2016  Byers ..................... A47G 29/14
(Continued)

FOREIGN PATENT DOCUMENTS

WO     WO2020/227247 A1   11/2020
WO     WO2021/092260 A1   5/2021
WO     WO-2023055878 A1 *   4/2023   ............. B64U 80/25

OTHER PUBLICATIONS

International Preliminary Report on Patentability for PCT/US2022/045151, dated Apr. 2, 2024, 9 pages.

*Primary Examiner* — Tyler D Paige
(74) *Attorney, Agent, or Firm* — Julie K. Staple; Fishman Stewart PLLC

(57) ABSTRACT

A smart landing platform system includes a flat and rigid platform for landing a drone and having a geometrical center, a center of gravity and a weight, a digital scale disposed beneath the platform for providing measurements of a weight distribution of the platform and the drone, and a control unit connected to the digital scale for instantaneous data collection and storing logic including a statistical inference algorithm based on a nonlinear least squares model to perform automated pre-flight safety check for the drone.

14 Claims, 15 Drawing Sheets

(51) Int. Cl.
   *B64U 10/13*          (2023.01)
   *B64U 80/25*          (2023.01)

(58) Field of Classification Search
   USPC ............................................................ 701/3
   See application file for complete search history.

(56)                    References Cited

U.S. PATENT DOCUMENTS

| | | | |
|---|---|---|---|
| 2017/0081043 A1* | 3/2017 | Jones ...................... | B64C 37/02 |
| 2017/0129603 A1* | 5/2017 | Raptopoulos ............. | B64F 1/22 |
| 2018/0178665 A1 | 6/2018 | Chen et al. | |
| 2020/0010214 A1* | 1/2020 | Newcomb ............... | B60L 53/51 |
| 2020/0062419 A1* | 2/2020 | Jimenez Hernandez ................... | |
| | | | B64U 50/30 |
| 2020/0349852 A1* | 11/2020 | DiCosola ................. | G08G 5/55 |
| 2021/0254360 A1* | 8/2021 | Wankewycz ........... | B64U 80/10 |
| 2022/0397915 A1* | 12/2022 | Ortman ................... | G08G 5/74 |
| 2022/0397917 A1* | 12/2022 | Arksey ............. | H04B 17/3913 |
| 2024/0400242 A1* | 12/2024 | Zhou ........................ | B64F 5/60 |

* cited by examiner

Samples

FIG. 21A
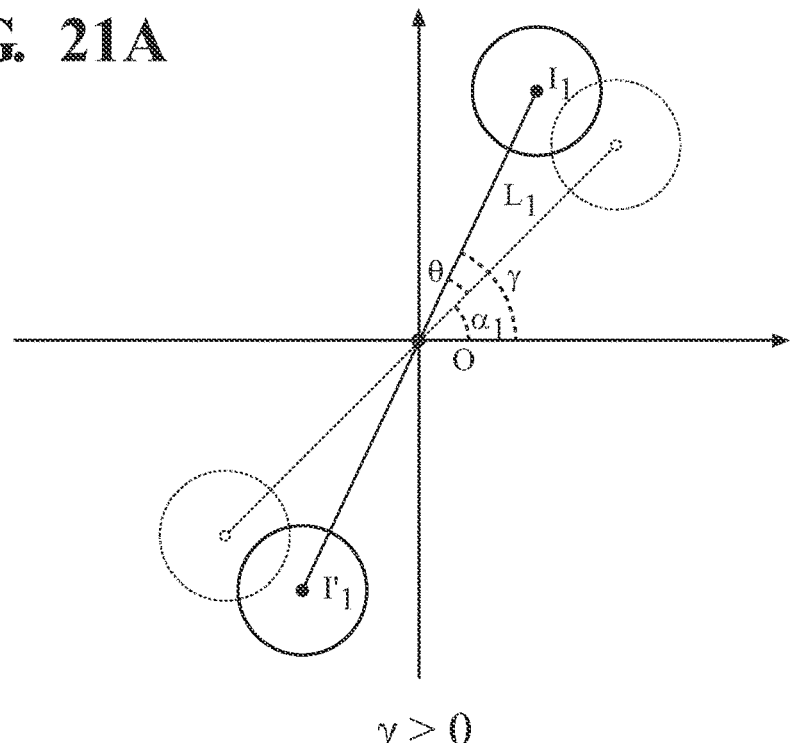
$\gamma > 0$
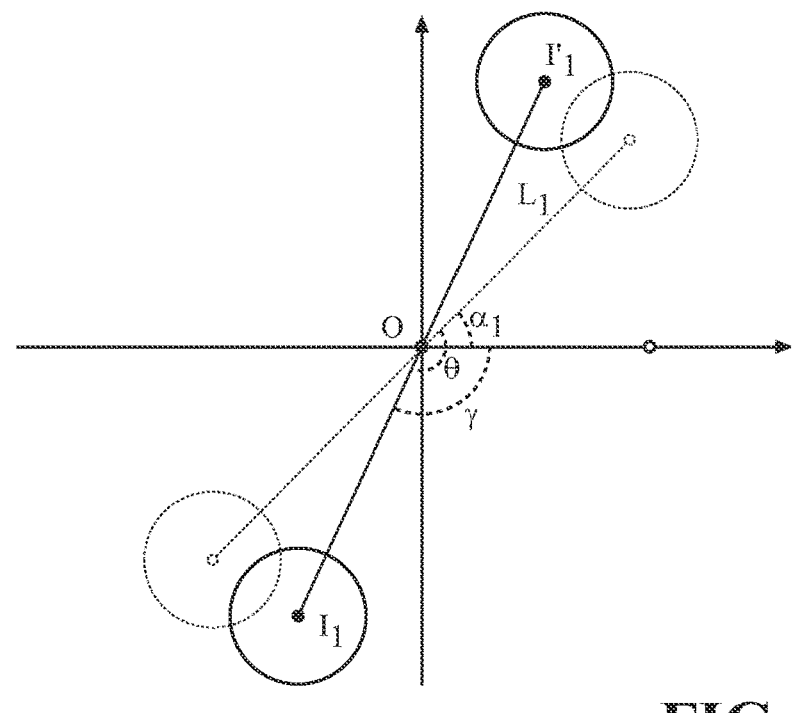
FIG. 21B
$\gamma < 0$

1

SMART LANDING PLATFORM WITH DATA-DRIVEN ANALYTIC PROCEDURES FOR UNMANNED AERIAL VEHICLE PRE-FLIGHT DIAGNOSIS

CROSS-REFERENCE TO RELATED APPLICATIONS

This application claims priority to co-pending PCT International Application Serial No. PCT/US2022/045151 filed Sep. 29, 2022, which claims priority to U.S. Provisional Patent Application No. 63/249,752 filed on Sep. 29, 2021, the entire content of both of which is incorporated herein by reference.

GOVERNMENT SUPPORT

This invention was made with government support under Contract No. CMMI-1944068 awarded by the National Science Foundation. The government has certain rights in the invention.

FIELD OF THE INVENTION

The present invention relates to a smart landing platform for landing an unmanned multicopter aircraft and methods for performing automated, unmanned pre-flight safety checks for the multicopter aircraft landed on the platform.

BACKGROUND OF THE INVENTION

Unmanned aircraft (UA), also known as drones, have been envisioned by many to transform the way people live and work. Large-scale deployment of autonomous drones for tasks such as package delivery, security patrol and traffic monitoring, etc., is believed to contribute an integral part of the smart city infrastructure.

Among the plethora of air frame types, the multirotor design accounts for the vast majority of small UA that exist today. Multirotor aircraft are also called multicoptors. Compared to fixed-wing aircraft, multicopters are preferred for low-altitude applications, because they are nimbler, easier to control and more permissible for airway limitations.

Safety is the utmost concern in aviation, for both manned and unmanned operations. Due to hardware limitations, small multicopters are unable to conduct physical checkups autonomously using onboard sensors. Human operators' visual examination, sometimes aided by tools, are currently required to identify obvious problems such as propeller damage, motor malfunction and payload misplacement. The reliance on human efforts for preflight checks not only impedes large-scale deployments of drones and increases the operational cost but also limits where drones can land. For instance, building rooftops that are widely envisioned to provide temporary landing space for drones might not be suitable to station a human operator, and hence could not be used for drone landing.

There is a continuing need for smart landing platforms for landing an unmanned multicopter aircraft and methods for performing automated, unmanned pre-flight safety checks for the multicopter aircraft landed on the platform.

SUMMARY OF THE INVENTION

The embodiments of the present invention provides a smart landing platform system including a flat and rigid platform for landing a drone and a digital scale disposed beneath the platform for providing measurements of a weight distribution of the platform and the drone. The platform may be a polygon, a circle, or any suitable geometrical shape having a geometrical center. The platform has a center of gravity and a weight. The smart landing platform system further includes a control unit communicatively connected to the digital scale for instantaneous data collection and storing logic including a statistical inference algorithm based on a nonlinear least squares model to perform automated pre-flight safety check for the drone.

The digital scale may be a plurality of digital load cells located at vertices of a regular polygon having a geometrical center overlapping with the geometrical center of the platform. For example, the digital scale may include four load cells.

The control unit may include a microcontroller to transfer instantaneous measurement readings of the digital load cells to the processing device every interval. The control unit may include a processing device for synchronized data collection and subsequent data processing. The processing device may be a computing device, a CPU or a computer etc. The processing device may be connected to the load cell wirelessly or via a wired connection. A microcontroller can be shared by all of the load cells or one microcontroller is provided for each load cell.

The present invention further provides a method of performing automated pre-flight safety check for a drone using a smart landing platform system according to the present invention. The present method includes measuring the weight of the platform in different statuses, estimating a weight change of the platform between the different statuses, estimating a force acting on the drone and positions of the propellers based on the estimated weight change of the platform between the different statuses using a nonlinear least squares model, and automatedly performing pre-flight safety check for the drone to determine anomalies based on the estimated force acting on the drone and positions of the propellers with respect to respective nominal values.

The different statuses may include a first status being a stable status when the platform is placed on the load cells before the drone is landed on the platform, a second status being a stable status when the drone is landed on the platform with the propellers not spinning and a third status being a variable status when one of the propellers is spinning.

The drone may have a pair of propellers connected by a rigid arm. The drone may have a plurality of pairs of propellers where each pair of propellers is connected by a rigid arm. The propellers are located at vertices of a regular polygon having a center overlapping with the geometrical center of the platform.

The position of each propeller includes an amount of translation and rotation of the propeller. The anomalies may be and not limited to damaged propellers, payload imbalance, and/or motor malfunction. The anomalies may be determined based on a principle of the resultant of all forces acting on the drone is zero when the drone is in equilibrium. The damaged propellers may be detected by comparing the measured values of the output force against what is expected for an intact propeller. The damaged propellers can also be detected by evaluating whether the center of gravity of the drone is aligned with the geometric center of the drone.

The present method further includes setting an initial load on each load cell to zero before putting the platform on the load cells.

The present invention further provides a system of integrated smart landing platforms including a plurality of smart landing platforms for drones. Each of the plurality of smart landing platforms is a smart landing platform according to the embodiments of the present invention.

The plurality of smart landing platforms may be distributed at a plurality of locations, such as on rooftops of buildings. The system may include one or more charging devices capable of powering one or more drones.

BRIEF DESCRIPTION OF THE DRAWINGS

FIGS. 21A and 21B show two scenarios of calculation of γ. The counterclockwise direction is the positive direction;

DETAILED DESCRIPTION

Figure 1:
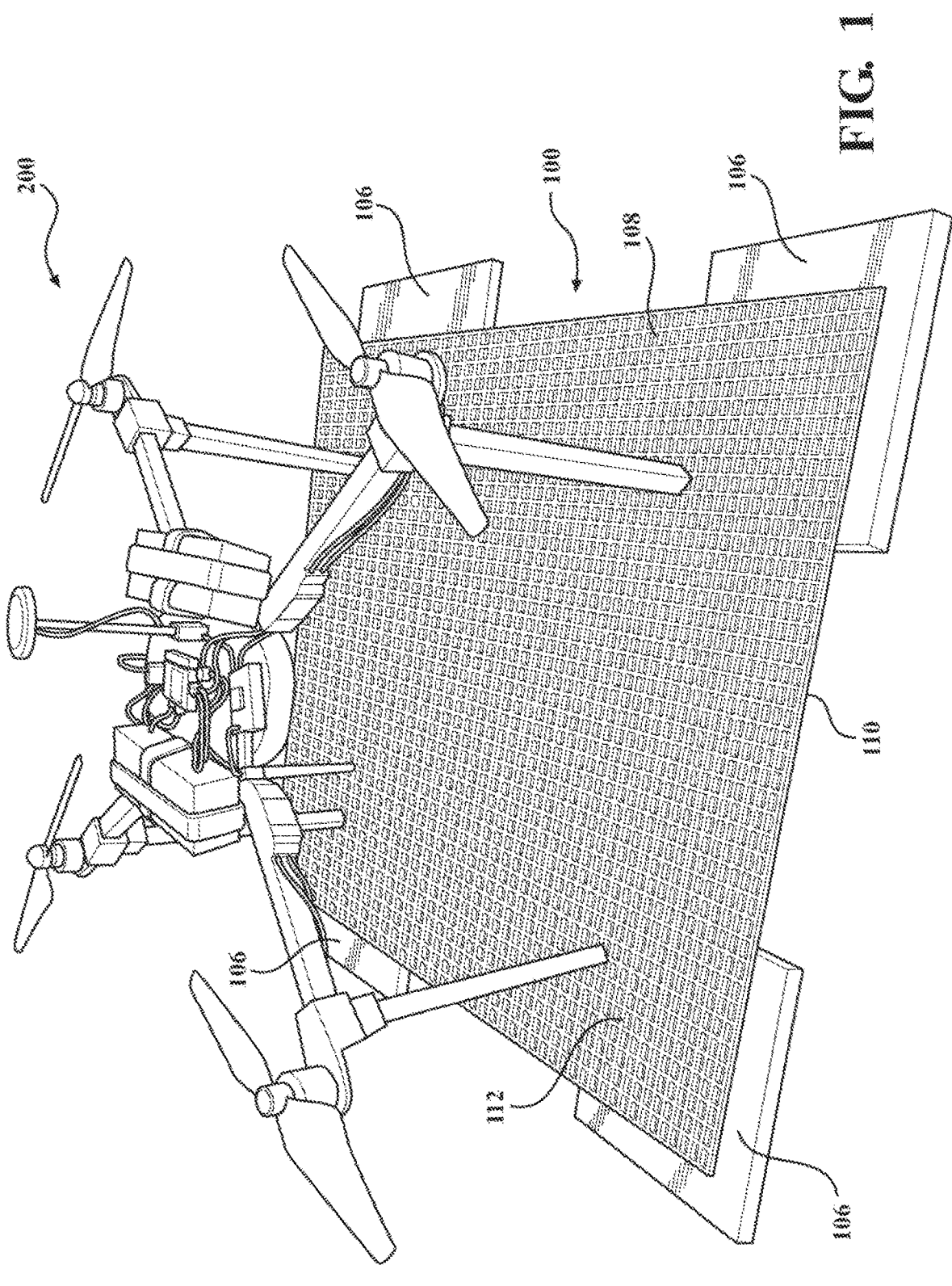
FIG. 1 shows a prototype platform with a multicopter on top constructed for experimentation and method validation. Four digital load cells are placed beneath the platform, which provide accurate measurements of the weight and weight distribution.

The singular terms "a," "an," and "the" are not intended to be limiting and include plural referents unless explicitly stated otherwise or the context clearly indicates otherwise.

The terms "includes," "comprises," "including," "comprising," "has," "having," and grammatical variations thereof, when used in this specification, are not intended to be limiting, and specify the presence of stated features, elements, and/or components, but do not preclude the presence or addition of one or more other features, elements, components, and/or groups thereof.

The term "about" as used herein in reference to a number is used herein to include numbers which are greater, or less than, a stated or implied value by 1%, 5%, 10%, or 20%.

Particular combinations of features are recited in the claims and/or disclosed in the specification, and these combinations of features are not intended to limit the disclosure of various aspects. Combinations of such features not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a alone; b alone; c alone, a and b, a, b, and c, b and c, a and c, as well as any combination with multiples of the same element, such as a and a; a, a, and a; a, a, and b; a, a, and c; a, b, and b; a, c, and c; and any other combination or ordering of a, b, and c).

The terms "first," "second," and the like are used herein to describe various features or elements, but these features or elements are not intended to be limited by these terms, but are only used to distinguish one feature or element from another feature or element. Thus, a first feature or element could be termed a second feature or element, and vice versa, without departing from the teachings of the present disclosure.

I. Overview

The embodiments of the present invention provide a weight-measuring landing platform along with a set of statistical inference algorithms aimed at performing automated, unmanned pre-flight safety checks for any multicopter aircraft that lands on the platform. A nonconvex nonlinear least squares model is disclosed herein for estimating the center of gravity and orientation of the aircraft, including a recursive formula for calculating the optimal solution. As demonstrated herein, methods of the present invention are capable of finding the global solution orders-of-magnitude faster than a global optimization solver. Real-system tests were carried out on a quadcopter drone deliberately configured to carry misplaced payload, and to use damaged propellers. Results show that a platform of the present invention is able to detect and profile these common safety issues with high accuracy.

Methods of the present invention are provided which perform automated, unmanned pre-flight safety checks for the multicopter aircraft landed on a smart landing platform of the present invention and provide answers to safety check questions, including, but not limited to:

Is the drone overloaded with heavy payload?

Is the center of gravity aligned with the geometric center of the air frame? Weight imbalance will cause certain motors spin harder than others and lead to motor failure due to overheat.

Are all motors able to spin as directed by the flight controller? Malfunctioning of the electronic speed controller (ESC) may render the motor unresponsive to flight control signals.

Are all propellers intact and able to generate the expected thrust? Propellers may have been damaged due to impact with foreign objects (i.e., birds, twigs, etc.) in operation.

Does the compass need re-calibration?

A smart landing platform is provided according to aspects of the present invention which includes a digital scale equipped with multiple load measuring tips (e.g., load cells) beneath a platform surface. The platform may be flat and rigid for landing a drone. The platform may have grid holes for allow airflow from the propellers to pass through. The digital scale is able to measure the weight and weight distribution of any drone that lands on it. When a motor spins at a given output level, the propeller, if in good condition, is expected to generate a calculable amount of upward lift, which would lead to a reduction and a redistribution of the drone's weight as measured by the platform. By analyzing the instantaneous weight measurements within a statistical inference framework, any of anomalies in weight distribution and in the actuation and propelling system can be detected and properly attributed.

The anomalies include but are not limited to damaged propellers, payload imbalance, and/or motor malfunction. The anomalies are determined based on the principle that the resultant of all forces acting on the drone is zero when the drone is in equilibrium. For example, the damaged propellers may be detected by comparing the measured values of the output force against what is expected for an intact propeller. The damaged propellers may also be detected by evaluating whether the center of gravity of the drone is aligned with the geometric center of the drone.

Figure 5:
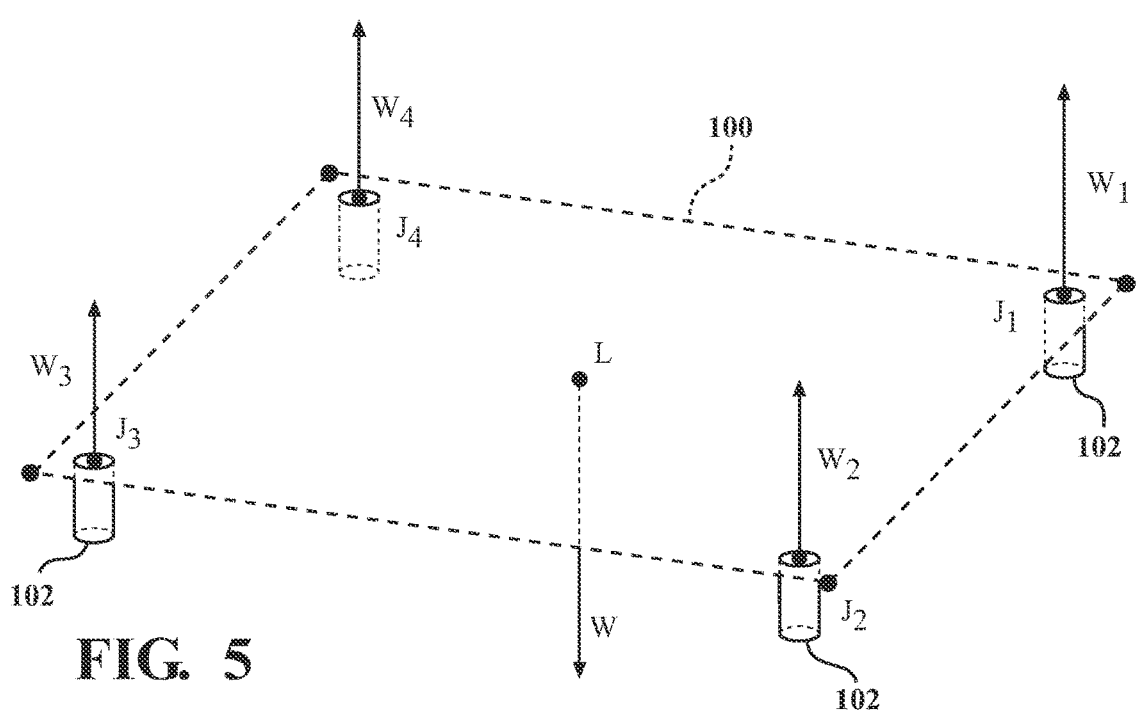
FIG. 5 shows illustration of the platform and measurement principles. The transparent rectangle with dashed lines represents the landing platform, and the four cylinders are load cells for measuring weights.
Figure 6:
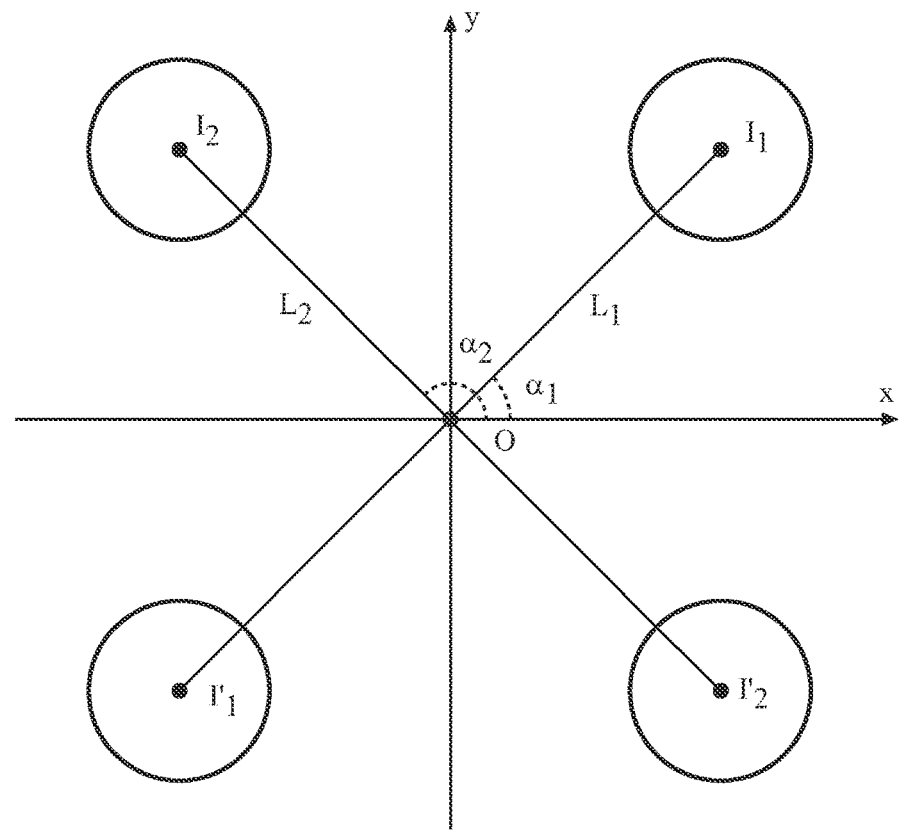
FIG. 6 shows geometry of a quadcopter air frame.
Figure 13:
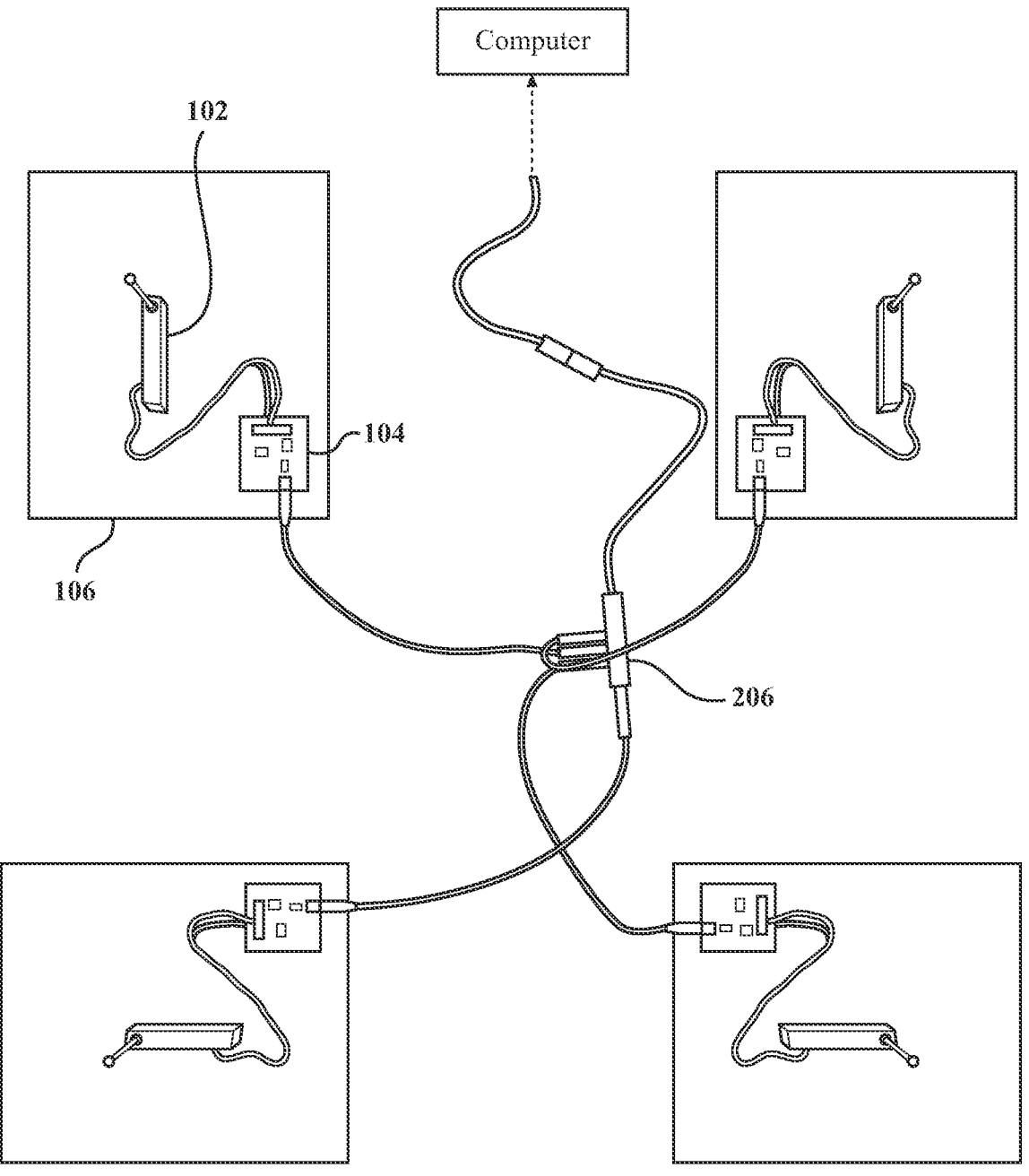
FIG. 13 shows a picture of the digital load cells beneath the landing platform.

A smart landing platform according to aspects of the present invention is shown in FIGS. 1, 5 and 13. A smart landing platform according to aspects of the present invention includes a platform 100 having a top side 108 and a bottom side 110. The platform may be flat and rigid for landing a drone 200 on the top side 108 of the platform 100. The platform may have grid holes 112 for allowing the airflow from the propellers of a drone to pass through. The platform 100 has a geometrical center, a center of gravity and a weight. As shown in FIG. 5, four digital load cells 102 (J1, J2, J3, J4) are disposed beneath the platform 100 for providing measurements of a weight distribution of the platform 100 and the drone 200. The bottom side 110 of the platform 100 is supported on the four load cells. The four load cells are each arranged at a vertex of a rectangle which geometrical center coincides with the geometrical center L of the platform 100. The digital load cells can provide measurements of a weight and weight distribution of any type of drone. The drone may have one pair of propellers connected by a rigid arm. The drone may have two or more pairs of propellers with each pair connected by a rigid arm. FIG. 1 shows the base 106 for each load cell beneath the platform 100. The view of the load cells are blocked by the platform and is not shown in FIG. 1.

A control unit may be communicatively connected to the load cells and provide a power source for the load cells. The control unit may include a microcontroller to transfer instantaneous measurement readings of the digital load cells to the processing device every interval. The control unit may include a processing device for synchronized data collection and subsequent data processing. The processing device may be a computing device, a CPU or a computer etc. The processing device may be connected to the load cell wirelessly or via a wired connection. The load cells can be parallel-connected to the computing device, such as a PC via a USB hub, for synchronized data collection. The computing device stores logic including a statistical inference algorithm based on a nonlinear least squares model to perform automated pre-flight safety check for the drone. In one example, the control unit includes one microcontroller which is configured to transfer the measurement readings of all of the digital load cells to the computing device. The computing device may be configured to control the drone to spin the propellers in sequence. Action commands can be sent to the drone, such as via a direct USB data link.

In another example, as shown in FIG. 13, each load cell 102 can be communicatively connected a microcontroller 104 to transfer instantaneous measurement readings of each digital load cell to the processing device every interval. All of the microcontrollers 104 can be communicatively parallel-connected to a processing device such as a computer via a hub 206 for synchronized data collection and subsequent data processing.

A nonlinear least squares model with air frame geometry constraints is provided according to aspects of methods of performing automated pre-flight safety check for a drone of the present invention to analyze the measurement data and draw accurate inferences. Since the load cells of the smart landing platform are able to take instantaneous measurements quickly, a large amount of samples may be recorded in a short diagnosis period. As the sample size increases, it becomes increasingly difficult for a numeric solver to find the global optimal solution (i.e., the best fit) within a practical diagnosis time frame. To overcome this difficulty, a closed-form analytical solution to the nonlinear optimization problem is derived according to aspects of methods of the present invention and proof of the uniqueness of the solution is provided herein. As a result, the computing time is reduced from many minutes to a few seconds. As demonstrated herein, effectiveness and practical value of a smart landing platform and algorithms included in methods of performing automated pre-flight safety check for a drone are validated via an extensive set of experiments.

Figure 2:
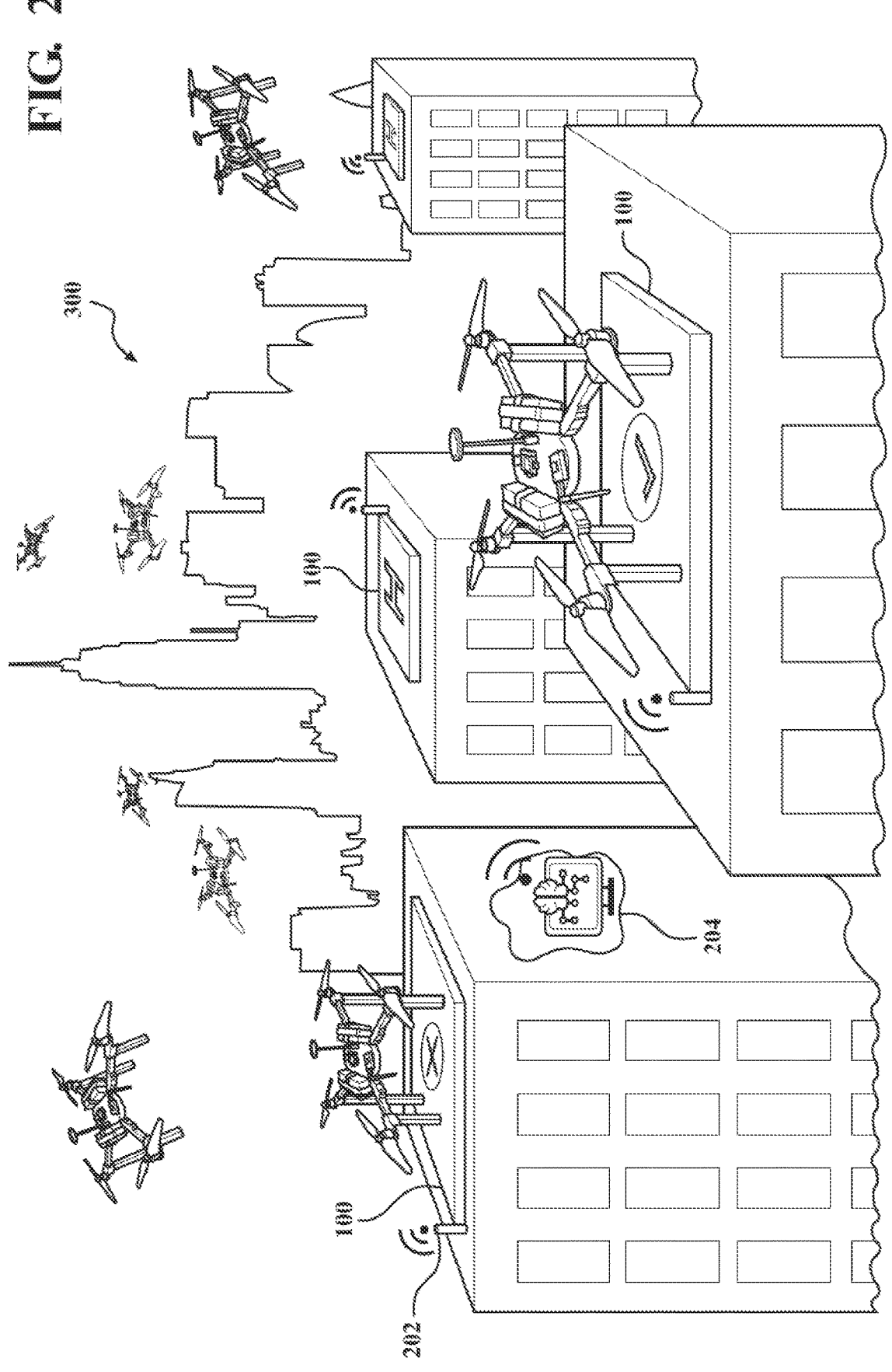
FIG. 2 shows a system integration of a plurality of the smart landing platforms in large-scale unmanned aerial vehicle (UAV) deployments.

Systems are provided according to aspects of the present invention which include a plurality of smart landing platforms distributed at a plurality of locations, such as, but not limited to, rooftops of buildings. FIG. 2 illustrates a system 300 according to aspects of the present invention which include a plurality of smart landing platforms 100 distributed at a plurality of rooftops of buildings. Each smart landing platform 100 is equipped with a digital scale. Each smart landing platform 100 may include a control unit. Alternatively, all of the smart landing platforms 100 of the system may be connected to a central control unit. Each smart landing platform 100 may include a connection 202 to the control unit or the central control unit. The connection 202 may be a wired connection or a wireless connection. The smart landing platforms may be elevated from the rooftop surfaces to allow room for the digital scales to be placed underneath the platforms.

Systems are provided according to aspects of the present invention which further include one or more remote chargers, and/or mobile launch pads or containers. Precision landing gears are included in a system according to aspects of the present invention.

II. Methods

Methods of the present invention are provided which perform automated, unmanned pre-flight safety checks for the multicopter aircraft landed on a smart landing platform of the present invention.

Methods according to aspects of the present invention include a nonlinear least squares model for estimating the center position and orientation of a single airframe arm based on the location samples of the two propellers installed on both ends of the arm. This is the baseline model on which the analytical solution is derived in Proposition 1. In subsection III-B, the model is extended to a multi-armed architecture that can include an arbitrary number of propeller pairs. The analytical solution is presented in Proposition 2. In subsection II-C, using a quadcopter as example, a diagnosis method according to aspects of the present invention is described for obtaining the location samples of the propellers, which serve as raw data for the statistical inference models. The index sets, parameters and decision variables involved in the mathematical models are listed in Tables 1-3, respectively.

TABLE 1

Definition of Index Sets

| Symbol | Description |
|---|---|
| $\mathcal{K}$ | set of scale status, $k \in \mathcal{K}$, <br> −1: stable status when the platform is placed on the load cells, before the drone is landed on the platform; <br> 0: stable status when the drone is landed on the platform, propellers not spinning; <br> 1-4 : status when propeller 1-4 spins at the respective stable level of output; |
| $\mathcal{T}_k$ | index set for weight measurement in step k, $t \in \mathcal{T}_k$, $k = -1, 0, 1, 2, 3, 4$ |
| $\mathcal{I}$ | set of pairs of propellers, $i \in \mathcal{I}$ |
| $\mathcal{J}$ | set of load cells, $j \in \mathcal{J}$ |
| S | set of samples, $s \in S$ |

TABLE 2

Definition of Parameters

| Symbol | Description |
|---|---|
| $w_{jt}$ | reading value from load cell j at time t |
| $\Delta w_{jtk}$ | change in the reading value from load cell j at time t under status k |
| $M_k$ | moment of force generated in status k |
| $W_k$ | force generated in status k |
| l | distance from the frame center to each propeller for the one-propeller-pair situation (cm) |

TABLE 2-continued

Definition of Parameters

| Symbol | Description |
|---|---|
| $l_i$ | distance from the frame center to the i-th propeller (cm) |
| $\alpha$ | angle between x-axis and the vector pointing from the frame center to the propeller above x-axis, in the one-propeller-pair situation |
| $\alpha_i$ | angle between x-axis and the vector pointing from the frame center to the t-th propeller in the 1st or 2nd quadrant |
| $x_j^S, y_j^S$ | x and y-coordinate of load cell j (cm) |

TABLE 3

Definition of Variables

| Symbol | Description |
|---|---|
| $p^{LCG}$ | center of gravity (CG) of the platform $(x^{LCG}, y^{LCG})$ |
| $x^{LCG}$ | x-coordinate of the platform's CG (cm) |
| $y^{LCG}$ | y-coordinate of the platform's CG (cm) |
| $p^{DCG}$ | CG of the drone $(x^{DCG}, y^{DCG})$ |
| $x^{DCG}$ | x-coordinate of the drone's CG (cm) |
| $y^{DCG}$ | y-coordinate of the drone's CG (cm) |
| $p^{DC}$ | geometric center point of the drone $(x^{DC}, y^{DC})$ |
| $x^{DC}$ | x-coordinate of the drone's geometric center (cm) |
| $y^{DC}$ | y-coordinate of the drone's geometric center (cm) |
| $P_{is}^{IS}$ | i-th propeller position from sample s $(x_{is}^{IS}, y_{is}^{IS})$ |
| $x_{is}^{IS}$ | x-coordinate of the i-th propeller position from sample s (cm) |
| $y_{is}^{IS}$ | y-coordinate of the i-th propeller position from sample s (cm) |
| $\bar{x}_i^{IS}, \bar{y}_i^{IS}$ | mean of x and y-coordinate of the i-th propeller position from its sample |
| $\theta$ | yaw of the drone, counter-clockwise direction is positive. $\theta \in (-\pi, \pi]$ |
| $P_i^P$ | position of propeller i $(x_i^P, y_i^P)$ |
| $x_i^P$ | x-coordinate of propeller i (cm) |
| $y_i^P$ | y-coordinate of propeller i (cm) |
| $W^L$ | weight of the platform (kg) |
| $W^D$ | weight of the drone (kg) |
| $F_{it}$ | lift force of propeller i from time t (kg) |

A. Estimating the Location and Orientation of a Single Pair of Propellers

Figures 3, 4:
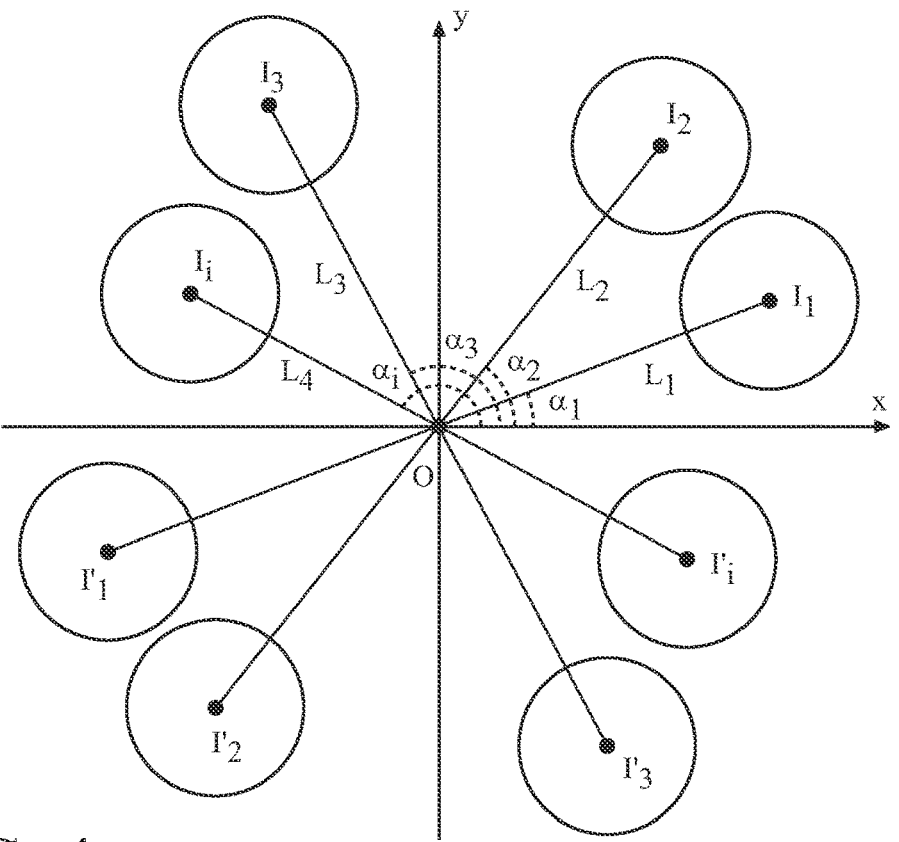
FIG. 3 shows a pair of propellers connected by a rigid arm. The objective of the single-pair problem is to infer the center location O and the orientation angle $\alpha_i$ from the positional measurements of the propellers.
FIG. 4 shows illustration of a generic air frame configuration with an arbitrary number of propeller pairs (arms). (Note that in theory the arm lengths and angular spaces need not be equal, though in practice they typically are)

FIG. 3 shows a pair of propellers $I_1$ and $I'_1$ located centrosymmetrically around point O, presumably linked by an rigid arm. Let $I_1O=I'_1O=l_1$ and the angle between $\overleftarrow{OI_1}$ and x-axis be $\alpha_1$. Suppose that the propeller pair rotates around O by $\theta$ and translates by $x^{DC}$ and $y^{DC}$, then the symmetric center will be moved to $(x^{DC}, y^{DC})$, and the x and the y-coordinate of propeller $I_1$ will be $x^{DC}+l_1 \cos(\alpha+\theta)$ and $y^{DC}+l_1 \sin(\alpha+\theta)$, respectively, and those of $I'_1$ will be $x^{DC}-l_1 \cos(\alpha+\theta)$ and $y^{DC}-l_1\sin(\alpha+\theta)$, respectively. Suppose the propeller pair lies somewhere in the plane, and the location of each propeller is measured $|S|$ times, and denote the measurements for $I_1$ and $I'_1$ by $(x_{1s}^{IS}, y_{1s}^{IS})$ and $(x'_{1s}^{IS}, y'_{1s}^{IS})$, respectively. It is assumed that there exists Gaussian noise in the measurements. To recover the center point location and the arm's orientation from these noisy measurements the sum of the squared errors between the estimate values (variables) and the measurement values (parameters) is minimized, leading to a least squares model with nonlinear geometric constraints.

$$\text{Minimize } \sum_s \left(x_1^P - x_{1s}^{IS}\right)^2 + \left(y_1^P - y_{1s}^{IS}\right)^2 + \tag{1}$$

$$\left(x_1'^P - x_{1s}'^{IS}\right)^2 + \left(y_1'^P - y_{1s}'^{IS}\right)^2 \text{ s.t.}$$

$$x_1^P = x^{DC} + l_1\cos(\alpha + \theta)$$

$$y_1^P = y^{DC} + l_1\sin(\alpha + \theta)$$

$$x_1'^P = x^{DC} - l_1\cos(\alpha + \theta)$$

$$y_1'^P = y^{DC} - l_1\sin(\alpha + \theta)$$

$$\theta \in (-\pi, \pi]$$

The above problem can be written as an (almost) unconstrained nonlinear optimization problem with bounds on the variable $\theta$, as follows.

$$\underset{x^{DC}, y^{DC}, \theta}{\text{Minimize}} \sum_s \left(x^{DC} + l_1\cos(\alpha + \theta) - x_{1s}^{IS}\right)^2 + \tag{2}$$

$$\left(y^{DC} + l_1\sin(\alpha + \theta) - y_{1s}^{IS}\right)^2 + \left(x^{DC} - l_1\cos(\alpha + \theta) - x_{1s}'^{IS}\right)^2 +$$

$$\left(y^{DC} - l_1\sin(\alpha + \theta) - y_{1s}'^{IS}\right)^2,$$

$$-\pi < \theta \le \pi$$

This problem can be solved by a numeric optimization solver. To simplify the solution process, the analytical solution for this problem is derived, as stated in Proposition 1. Proposition 1 The optimal solution $(x^{DC*}, y^{DC*}, \theta*)$ to problem (2) is:

$$x^{DC*} = \sum_s \left(x_{1s}^{IS} + x_{1s}'^{IS}\right)/(2|S|)$$

$$y^{DC*} = \sum_s \left(y_{1s}^{IS} + y_{1s}'^{IS}\right)/(2|S|)$$

$$\theta^* = \begin{cases} n\pi - \alpha + \dfrac{b}{\sqrt{b^2}}\arccos\dfrac{a}{\sqrt{a^2 + b^2}}, & b \ne 0 \\[2ex] n\pi - \alpha + \arccos\dfrac{a}{\sqrt{a^2 + b^2}}, & b = 0 \end{cases}$$

where $a=\sum_s (x_{1s}^{IS}-x'_{1s}{}^{IS}$, $b=\sum_s (y_{1s}^{IS}-y'_{1s}{}^{IS})$ and n is any nonnegative even integer that makes $\theta^*$ fall in the interval $(-\pi, \pi]$.

The (sufficient) optimality condition states that any point $x^*$ at which $\nabla f(x^*)=0$ and $\nabla^2 f(x^*)$ is positive definite is a strong local minimizer of $f$. The formulae for $(x^{DC*}, y^{DC*}, \theta^*)$ in the above proposition are derived by setting the partial derivatives of equation (2) with respective to each variable to zero. To show that the first-order solution is indeed a minimizer of the function, it is shown that the Hessian matrix is positive semi-definite at the calculated $(x^{DC*}, y^{DC*}, \theta^*)$ values. The detailed proof is given in Appendix B.

B. Model and Analytical Solution For Multiple Propeller Pairs

The above-described model is extended to account for a general air frame architecture with multiple pairs of propellers. FIG. 4 demonstrates such a generic set up with $n \ge 2$ pairs of propellers $I_i$ to $I'_i$. For each propeller pair $L_i$, the distance to its symmetric center is $l_i$ and the angle between $L_i$ and the x-axis $\alpha_i$. Note that it is not required that all arms are of equal length. The least squares model for estimating the center point location and air frame orientation can be formulated similarly to the single pair of propellers condition, then define $f(x^{DC}, y^{DC}, \theta)$ to denote the general function to optimize, to write $\min f(x^{DC}, y^{DC}, \theta)$ as follows.

$$\text{Minimize } \sum_i \sum_s \left(x_i^P - x_{is}^{IS}\right)^2 + \left(y_i^P - y_{is}^{IS}\right)^2 + \tag{3}$$

$$\left(x_i'^P - x_{is}'^{IS}\right)^2 + \left(y_i'^P - y_{is}'^{IS}\right)^2 \text{ s.t.}$$

$$x_i^P = x^{DC} + l_i\cos(\alpha_i + \theta)$$

$$y_i^P = y^{DC} + l_i\sin(\alpha_i + \theta)$$

$$x_i'^P = x^{DC} - l_i\cos(\alpha_i + \theta)$$

$$y_i'^P = y^{DC} - l_i\sin(\alpha_i + \theta)$$

$$\theta \in (-\pi, \pi]$$

Define $f(x^{DC}, y^{DC}, \theta)$ to denote the general function to optimize, we can write $\min f(x^{DC}, y^{DC}, \theta)$ as follows.

$$\underset{x^{DC}, y^{DC}, \theta}{\text{Minimize}} \sum_i \sum_s \left(x^{DC} + l_1\cos(\alpha_i + \theta) - x_{is}^{IS}\right)^2 + \tag{4}$$

$$\left(y^{DC} + l_1\sin(\alpha_i + \theta) - y_{is}^{IS}\right)^2 + \left(x^{DC} - l_1\cos(\alpha_i + \theta) - x_{is}'^{IS}\right)^2 +$$

$$\left(y^{DC} - l_1\sin(\alpha_i + \theta) - y_{is}'^{IS}\right)^2$$

$$-\pi < \theta \le \pi$$

The analytical solution for problem (4) is not as straightforward to express as that for the single-arm problem (2). It requires a recursive functional evaluation. Furthermore, in each recursive step the intermediate variable $\beta_i$ must be projected into the desired angular range of $[-\pi/2, \pi/2]$. The following lemma is put forward to justify the uniqueness of the results from the range projection operator $[\cdot]:$, which is defined and used subsequently.

Lemma 3.1 Given 1, $u \in \mathbb{R}$, and $1 < u$, for any $a \in \mathbb{R}$, there exists a unique $n \in \mathbb{Z}$ such that $$l < a + n(u - l) < u$$

Proof. Assume that $\exists m, n \in \mathbb{Z}$ such that $$l < a + n(u - l) < u$$

$$l < a + m(u - l) < u$$

When $n > m$, their extreme values are $$n < \frac{u - a}{u - l} \text{ and } m > \frac{l - a}{u - l}$$

So, $$n - m < \frac{u - a}{u - l} - \frac{l - a}{u - l}$$

and thus, n−m<1. On the other hand, when n<m, n−m>−1 can be obtained by the same way, thus −1<n−m<1. Since m,n ∈ ℤ, n−m=0. Thus, the uniqueness of n is established. According to Lemma 3.1, such an n as n* can be denoted. Define $[a]_l^u$ to be a+n*(u−l), i.e. 1<$[a]_l^u$<u. Then for every a, there exists a unique value for $[a]_l^u$.

Proposition 2 The optimal solution $(x^{DC*}, y^{DC*}, \theta*)$ to problem (4) is:

$$x^{DC*} = \sum_i \sum_s \left(x_{is}^{IS} + x_{is}'^{IS}\right)/2(I|S|)$$

$$y^{DC*} = \sum_i \sum_s \left(y_{is}^{IS} + y_{is}'^{IS}\right)/2(I|S|)$$

$$\theta^* = n\pi - \beta_I$$

where $$a_i = \sum_s \left(x_{is}^{IS} - x_{is}'^{IS}\right)$$

$$b_i = \sum_s \left(y_{is}^{IS} - y_{is}'^{IS}\right)$$

$$\gamma_i = \begin{cases} \dfrac{b_i}{\sqrt{b_i^2}} \arccos \dfrac{a_i}{\sqrt{a_i^2 + b_i^2}}, & b_i \neq 0 \\ \arccos \dfrac{a_i}{\sqrt{a_i^2 + b_i^2}}, & b_i = 0 \end{cases}$$

$$A_i = \sqrt{\begin{array}{l}(A_{i-1}\cos\beta_{i-1} + B_{i-1}\cos\mu_{i-1})^2 + \\ (A_{i-1}\sin\beta_{i-1} + B_{i-1}\sin\mu_{i-1})^2\end{array}}, \quad i = 2, 3, \ldots, I$$

$$\beta_i = \left[\arctan\left(\frac{A_{i-1}\sin\beta_{i-1} + B_{i-1}\sin\mu_{i-1}}{A_{i-1}\cos\beta_{i-1} + B_{i-1}\cos\mu_{i-1}}\right) + \begin{cases} \pi & \beta_{i-1} > \pi/2, \\ -\pi & \beta_{i-1} < -\pi/2, \\ 0 & -\pi/2 \geq \beta_{i-1} \leq \pi/2, \end{cases}\right]_{-\pi}^{\pi},$$

$$i = 2, 3, \ldots, I$$

$$B_i = 2l_{i+1}\sqrt{a_{i+1}^2 + b_{i+1}^2}, \quad i \leq I - 1$$

$$\mu_i = \alpha_{i+1} - \gamma_{i+1}, \quad i \leq I - 1$$

$$A_1 = 2l_1\sqrt{a_1^2 + b_1^2}$$

$$\beta_1 = [\alpha_1 - \gamma_1]_{-\pi}^{\pi}$$

The proof of Proposition 2 is similar to the proof of Proposition 1. The partial derivatives are obtained to calculate critical point, and obtain all the second partial derivatives to get the Hessian matrix $H_f$. Finally $(x^{DC*}, y^{DC*}, \theta*)$ is proved as the local minimum point for problem (4). The detailed proof is given in Appendix C.

C. Measurement Principles and Procedure

Theorem 3.2 (Equilibrium, J. Meriam and L. Kraige, Engineering Mechanics, vol 1, Statics. John Wiley & sons, 2011, page 109) When a body is in equilibrium, the resultant of all forces acting on it is zero. Thus, the resultant force R and the resultant couple M are both zero, and the equilibrium equations are:

$$R = \sum F = 0 \text{ and} \tag{5}$$

$$M = \sum M = 0 \tag{6}$$

These requirements are both necessary and sufficient conditions for equilibrium.

Theorem 3.2 implies that, at equilibrium, the magnitude and position of an unknown force can always be obtained by the other known forces in the system. So, define $\mathcal{F}_k(\Delta w_{jtk})=(x_t, y_t, W_t)$ as a function that given change of scale reading at time t under status $k(\Delta w_{jtk}$, the "known forces"), to calculate the new force to the system at time t compared with time 0 with magnitude $W_t$ and the x and y-coordinates $x_t, y_t$. Then:

$$W_t = \sum_{j \in \mathcal{J}} \Delta w_{jtk} - \sum_{k''=-1}^{k'-1} W_{k''}, \forall t \in \mathcal{T}_k, k' = \min(1, k) \tag{7}$$

$$x_t = \frac{1}{W_t}\left(\sum_{j \in \mathcal{J}} \Delta w_{jtk} x_j^S - \sum_{k''=-1}^{k'-1} M_{k''}\right), \forall t \in \mathcal{T}_k, k' = \min(1, k) \tag{8}$$

$$y_t = \frac{1}{W_t}\left(\sum_{j \in \mathcal{J}} \Delta w_{jtk} y_j^S - \sum_{k''=-1}^{k'-1} M_{k''}\right), \forall t \in \mathcal{T}_k, k' = \min(1, k) \tag{9}$$

FIG. 5 shows a sketch of the platform, and the platform instantiates the "body" in equilibrium referred to in Theorem 3.2. At equilibrium, equation (5) is instantiated by (7), which states that the resultant force of the support forces from four measure points $w_1$, $W_2$, $W_3$ and $w_4$ and all forces on the platform W is zero. Equation (6) is instantiated by (8) and (9), which states that the resultant moment of support forces and all forces on the platform is also zero. For simplicity, the propellers' wind effect on the platform was ignored, which is indeed negligible in practice as evidenced in physical demonstrations shown and/or described herein. Equations (7), (8) and (9) can be summarized as a general function to calculate the new force and its position, given in Algorithm 1. The complete testing procedure for a quadcopter drone is given in Algorithm 2. Calculation details for each status k are given in Appendix A.

---

Algorithm 1 Calculate the the new force and its location.

```
1: function 𝓕(Δw_j)              ▷ The change of w_j
2:    W ← Σ_{j∈𝒥} Δw_j
3:    x ← 1/W Σ_{j∈𝒥} Δw_j x_j^S
4:    y ← 1/W Σ_{j∈𝒥} Δw_j y_j^S
5:    return (x, y, W)
```

---

Algorithm 2 Measurement procedure for quadcopter drones.

```
1: for t ∈ 𝒯_{-1} do              ▷ Get weight of the platform
2:    w_{jt} ← w_j, ∀j ∈ 𝒥
3: w̄_{-1j} ← 1/|𝒯_{-1}| Σ_{t∈𝒯_{-1}} w_{jt}
4: for t ∈ 𝒯_0 do
5:    w_{jt} ← w_j, ∀j ∈ 𝒥
```

-continued

---

Algorithm 2 Measurement procedure for quadcopter drones.

6: $\overline{w}_{0j} \leftarrow \frac{1}{|\mathcal{T}_0|} \sum_{t \in \mathcal{T}_0} w_{jt}$ 7: $\Delta w \leftarrow \overline{w}_{0j} - \overline{w}_{-1j}$
8: $(x_0, y_0, W_0) \leftarrow \mathcal{F}(\Delta w)$     ▷ Get CG and weight of the drone
9: $x^{DCG} \leftarrow x_0$
10: $y^{DCG} \leftarrow y_0$
11: $W^D \leftarrow W_0$
12: for i = 1 to 4 do
13:    for t ∈ $\mathcal{T}_i$ do
14:      $w_{jt} \leftarrow w_j, \forall j \in \mathcal{J}$
15:      $\Delta w \leftarrow w_{jt} \leftarrow \overline{w}_{0j}$
16:      $(x_i, y_i, W_i) \leftarrow \mathcal{F}(\Delta w)$   ▷ Get position and force of propeller i
17:      $x_{it}^{IS} \leftarrow x_i$
18:      $y_{it}^{IS} \leftarrow y_i$
19:      $F_{it} \leftarrow W_i$
20: return $(x_i, y_i, W_i)$, i ∈ {0, 1, 2, 3, 4}

---

III. Experiments

In this section, experiments are performed with both simulated data and a real system under different parameter settings to validate Proposition 2 and demonstrate the practical use and effectiveness of the proposed procedures.

A. Simulation Experiment

In this example, simulation experiments were performed on a Dell Precision Tower 3420 computer with an Intel Core i7-7700 CPU @ 3.60 GHz, 32.0 GB RAM and 64-bit Windows 10 Enterprise Operating System. LINDOGlobal solver (via GAMS 30.1.0) was used for global optimizer. Relative optimality threshold was set to $10^{-7}$. Python 3.7 was used for implementing the analytical method.

1) Experiments on Different Numbers of Propellers

Two datasets were generated in this example. In order to observe the effects of the number of propellers on solution time, 6 multicopters with 2, 4, 6, 8, 10, and 12 propellers were simulated, and used a sample of 50 for each propeller. The arm length $l_i$ was chosen randomly between 10 cm and 30 cm, and the propeller angle $\alpha_i$ for each pair i was randomly chosen in the interval $(0, \pi)$. For each of simulated multicopter, 20 batches (b=1,2, . . . ,20) were generated. In each batch, the x and y-coordinates $(x_b^{DC}$ and $y_b^{DC})$ of the geometric centers of the multicopter were randomly generated within [−2,2]cm and the yaw angle of drone $\theta_b$ was randomly generated within [−0.99π, 0.99π]. Then the x and y-coordinates for different propeller positions $x_{is}^{IS}$, $y_{is}^{IS}$ $x'_{is}^{IS}$, $y'_{is}^{IS}$ can be generated as:

$$x_{is}^{IS} = x_b^{DC} + l_i\cos(\alpha_i + \theta_b) + \epsilon_{is} \tag{10}$$

$$y_{is}^{IS} = y_b^{DC} + l_i\sin(\alpha_i + \theta_b) + \epsilon_{is} \tag{11}$$

$$x_{is}'^{IS} = x_b^{DC} - l_i\cos(\alpha_i + \theta_b) + \epsilon_{is} \tag{12}$$

$$y_{is}'^{IS} = y_b^{DC} - l_i\sin(\alpha_i + \theta_b) + \epsilon_{is} \tag{13}$$

$i \in \{\{1\}, \{1, 2\}, \dots, \{1, 2, \dots, 6\}\}; s = 1, 2, \dots, 50; b = 1, 2, \dots, 20$ where $\epsilon_{is}$ is random error uniformly distributed in the range [−1.5,1.5] cm. The model was solved using both the analytical method given in Proposition 2 and the numerical solver LINDOGlobal. The solution time for each case was then recorded. Taking the average solution time of all batches within each propeller count setting, the results shown in FIG. 7 were obtained.

Figure 7:
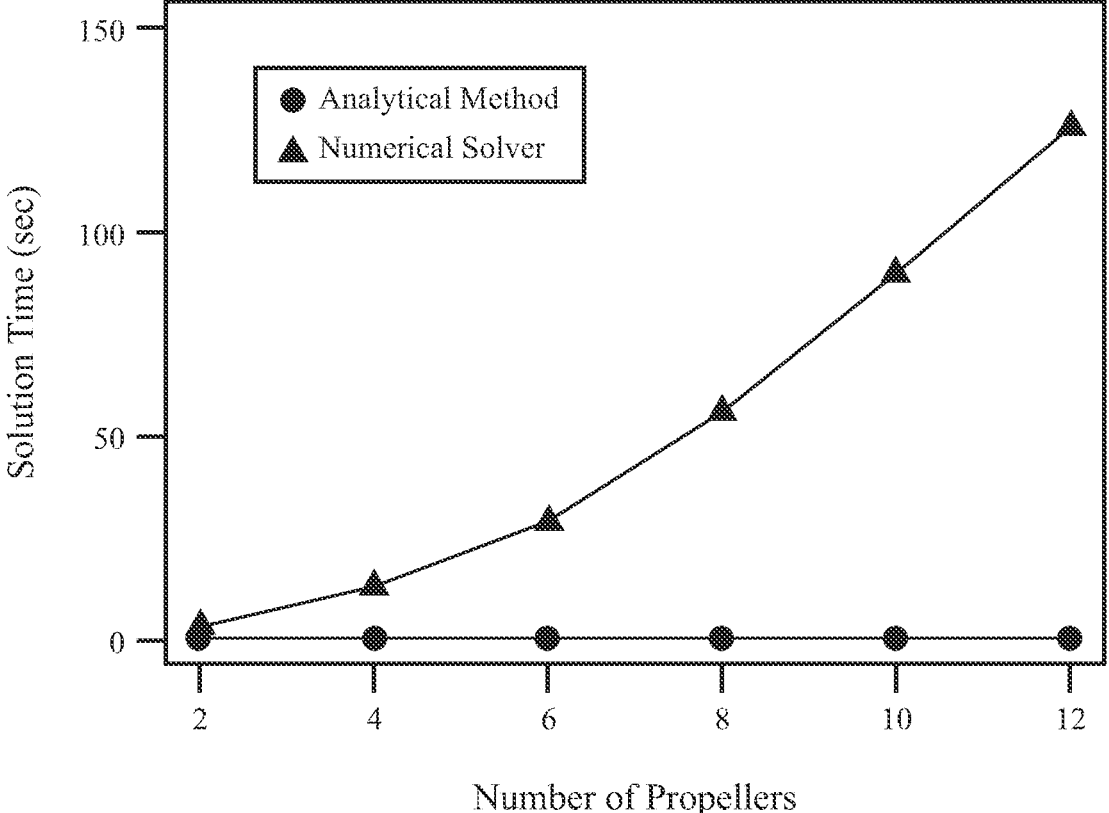
FIG. 7 shows solving time comparison between analytical method and numerical solver at different number of propellers, 50 samples for each propeller.

As shown in FIG. 7, the time taken for the global optimization method increases significantly as the structure of the multicopter becomes more complex. A mulitcopter with 12 propellers requires 125.1 seconds for the numerical solver to get the exact position, the analytical method included in methods of the present invention requires less than 0.1 second to achieve the same result.

The results are compared with the ground-truth values used for generating the datasets, and the differences are summarized in Table 4. The distribution of the differences are not significantly different from normal distribution, which is expected.

TABLE 4

The differences between actual values and the estimated (solution) values for $x^{DC}$, $y^{DC}$ and θ, with different number of propellers. A sample size of 50 was used in this experiment.

| I | $\overline{x_b^{DC*}} - \overline{x_b^{DC}}$ | $\overline{y_b^{DC*}} - \overline{y_b^{DC}}$ | $\overline{\theta_b^{DC*}} - \overline{\theta_b^{DC}}$ |
|---|---|---|---|
| 1 | 0.01285 | 0.01205 | −0.0011 |
| 2 | 0.00155 | 0.00860 | −0.0011 |
| 3 | −0.01325 | 0.00085 | −0.0001 |
| 4 | 0.00485 | −0.00395 | 0.0000 |
| 5 | 0.00465 | −0.00415 | 0.0000 |
| 6 | −0.00120 | 0.00125 | 0.0003 |

Figure 8:
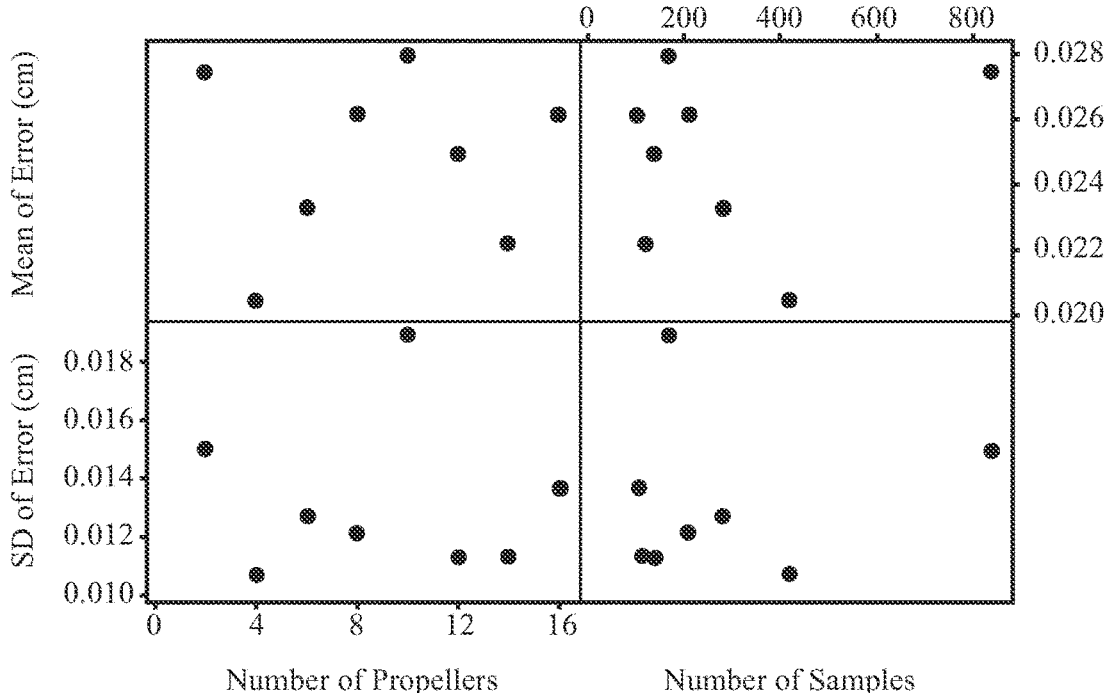
FIG. 8 shows changes in mean and standard deviation of translational errors with different number of propellers.
Figure 9:
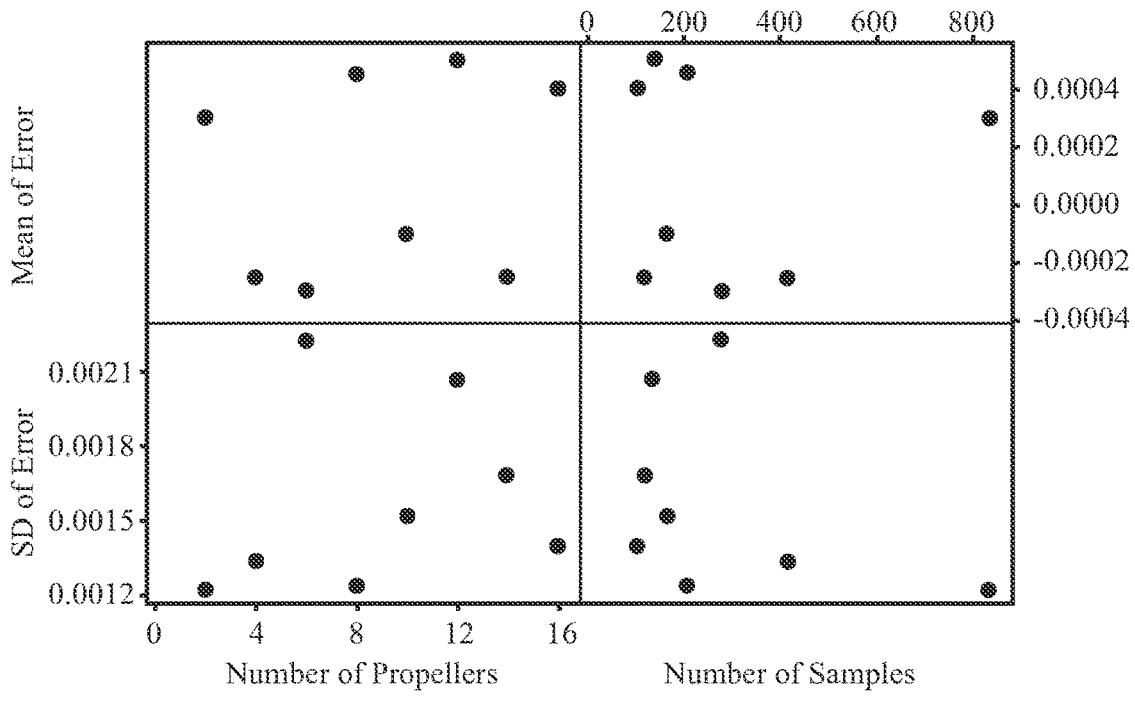
FIG. 9 shows changes in mean and standard deviation of rotational errors with different number of propellers.

To control for the effect of sample size, experiments with the same total sample size (1680) were performed. So for this experiment, the sample size was adjusted to keep the total sample size constant for different number of propellers. Values for $x_{is}^{IS}$, $y_{is}^{IS}$, $x'_{is}^{IS}$, $y'_{is}^{IS}$ were generated by the same method in equations (9) to (12), where i ∈ {{1}, {1,2}, . . . , {1,2, . . . ,9}}, s=1,2, . . . ,420/I and b=1,2, . . . ,20. Twenty batches of multicopters with the number of propellers ranging from 2 to 18 were simulated, all having an arm length of $10\sqrt{2}$cm, all propellers being located at the vertices of a regular polygon, and the initial angle $\alpha_1$ being set at a position such that the x-axis bisects the angle between arm $L_1$ and $L'_1$. In each batch, x and y-coordinate of the geometric centers $x_b^{DC}$ and $y_b^{DC}$ of the multicopter were randomly generated within [−2,2] cm and the yaw of drone $\theta_b$ was randomly generated within [−0.99π, 0.99π]. For each propeller number setting, the average value of the distance difference (mean of distance error) between the model-predicted translation and the actual position was used, and the average value of the angle difference (mean of angle error) between the model-predicted rotation and the actual rotation angle to obtain the experimental results in FIG. 8 and FIG. 9, respectively. It can be seen that the number of propellers of the multicopter does not affect the accuracy of the predicted positions when the total sample size is held constant.

Figure 10:
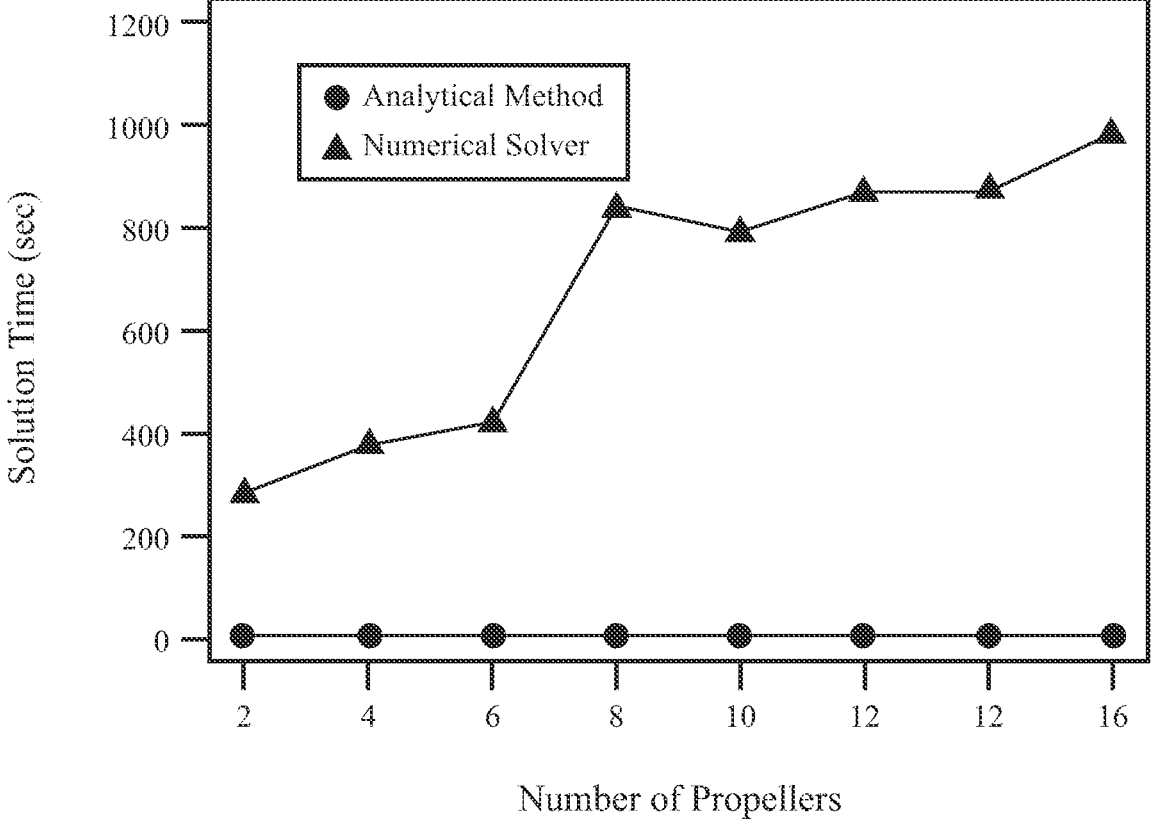
FIG. 10 shows solution time comparison between the analytical method and the numerical solver at different number of propellers. (1680 samples were used for all propellers)

FIG. 10 shows the solution time of the analytical method and numerical solver for each number of propellers and the same total number of samples. Since the solution time for some batches in numerical solver was longer than 3600 seconds (the process was terminated when solution time reaches 3600 seconds for efficiency and any solution time longer than 3600 seconds were recorded as 3600 s), and the median was used to present the results. The number of propellers and the solution time are roughly positively correlated for numerical solver, while the solution time in analytical method remains consistently small despite the increasing number of propellers involved in the system.

2) Experiments on Different Sample Sizes

To understand how the sample size of each propeller affects the solution time, 6 sample sizes: 50, 100, 150, 200, 250 and 300 were generated in this example, using a centrosymmetrical quadcopter structure with two pairs of propellers (i.e., i=2). The arm length is $10\sqrt{2}$ cm (i.e., $l_1=l_2\approx14.1$ cm). The initial angles between the arms to x-axis are $\pi/4$ and $\frac{3}{4}\pi$ (i.e., $\alpha_1=\pi/4$ and $\alpha_2=\frac{3}{4}\pi$). The method to generate $x^{DC}$, $y^{DC}$ and $\theta$ is the same, as above. Propellers position $x_{is}^{IS}$, $y_{is}^{IS}$, $x'_{is}^{IS}$, $y'_{is}^{IS}$ were obtained for the quadcopter by equations (10), (11), (12) and (13), where i=1,2, s $\in$ {{1,2, . . . ,50}, {1,2, . . . ,100}, . . . , {1,2, . . . ,300}} and b=1,2, . . . ,20. The solution time of the two methods for this dataset is presented in FIG. 16.

Figure 16:
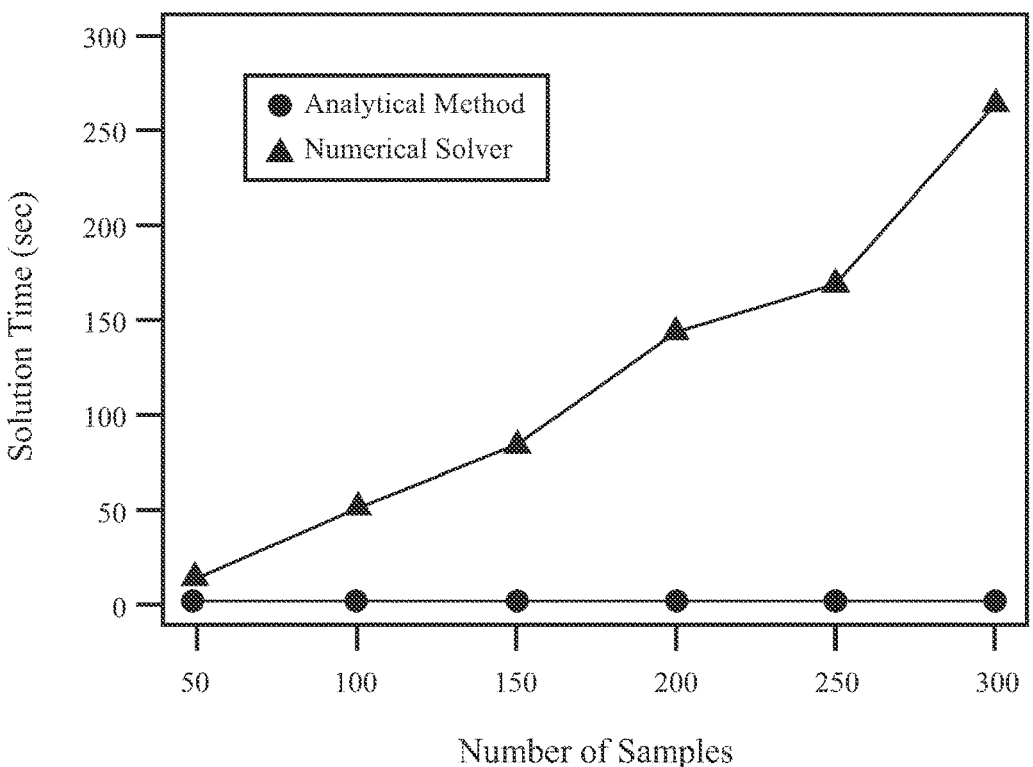
FIG. 16 shows solving time comparison between analytical method and numerical solver at different number of samples, 4 propellers.
Figure 17:
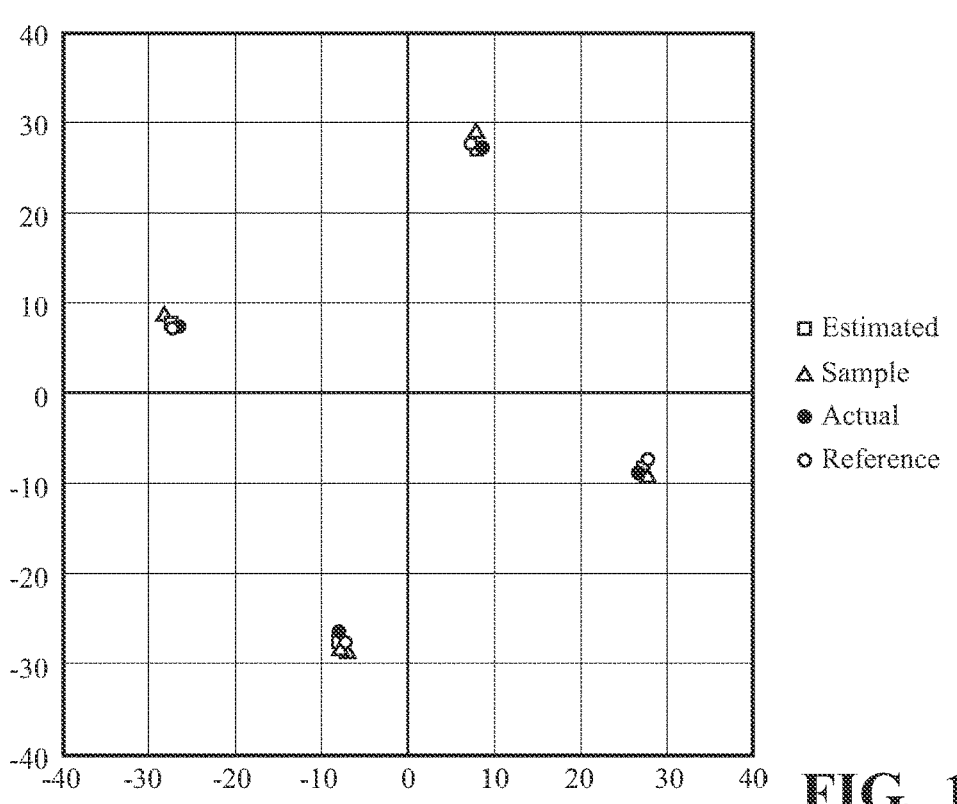
FIG. 17 shows propeller positions (motor output=40%, rotation: 30, sample size: 9.$x^{DC}$=−0.146 cm, $y^{DC}$=0.0:222 cm, θ=0:502 rad.)

In FIG. 16, there is a clear increasing trend of computing time as more samples are taken. For a standard quadcopter, it took the numerical solver 11.8 seconds to solve an instance of 50 samples, and the analytical method took only 0.028 seconds on average. The analytical method remained robust in solution time even if the sample size becomes as large as 300.

Figure 11:
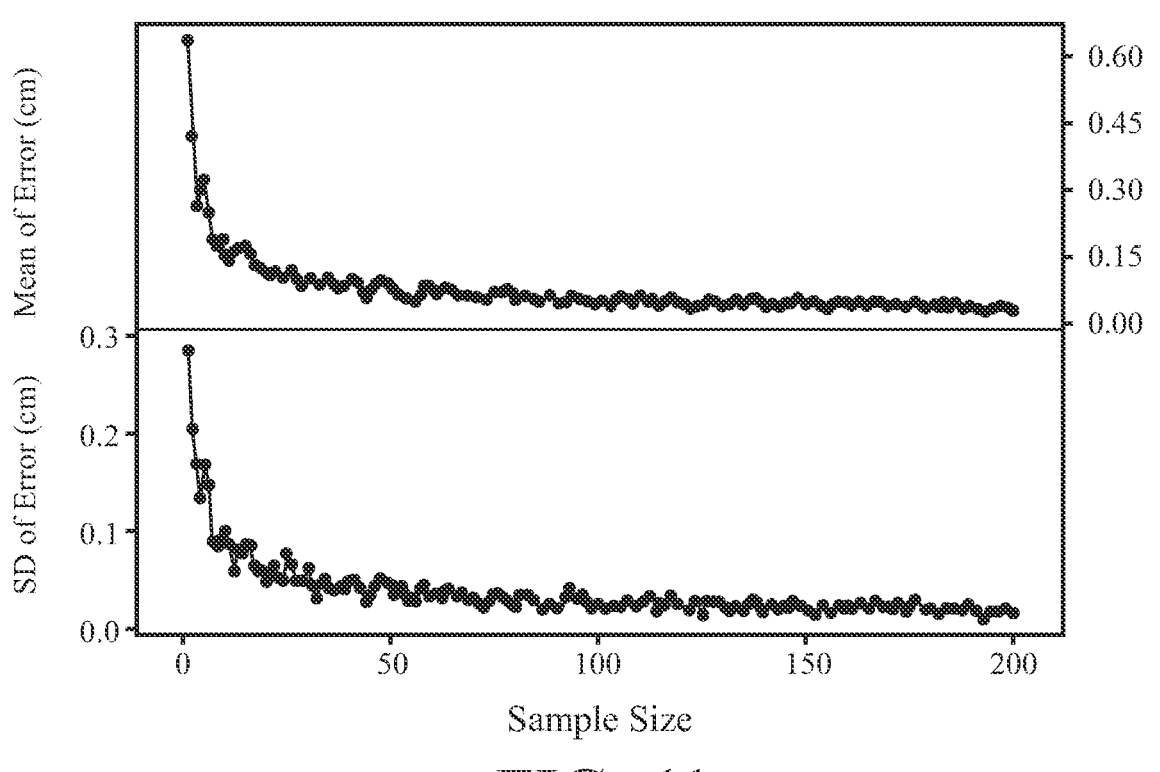
FIG. 11 shows changes in mean and standard deviation of positional errors with different sample size.
Figure 12:
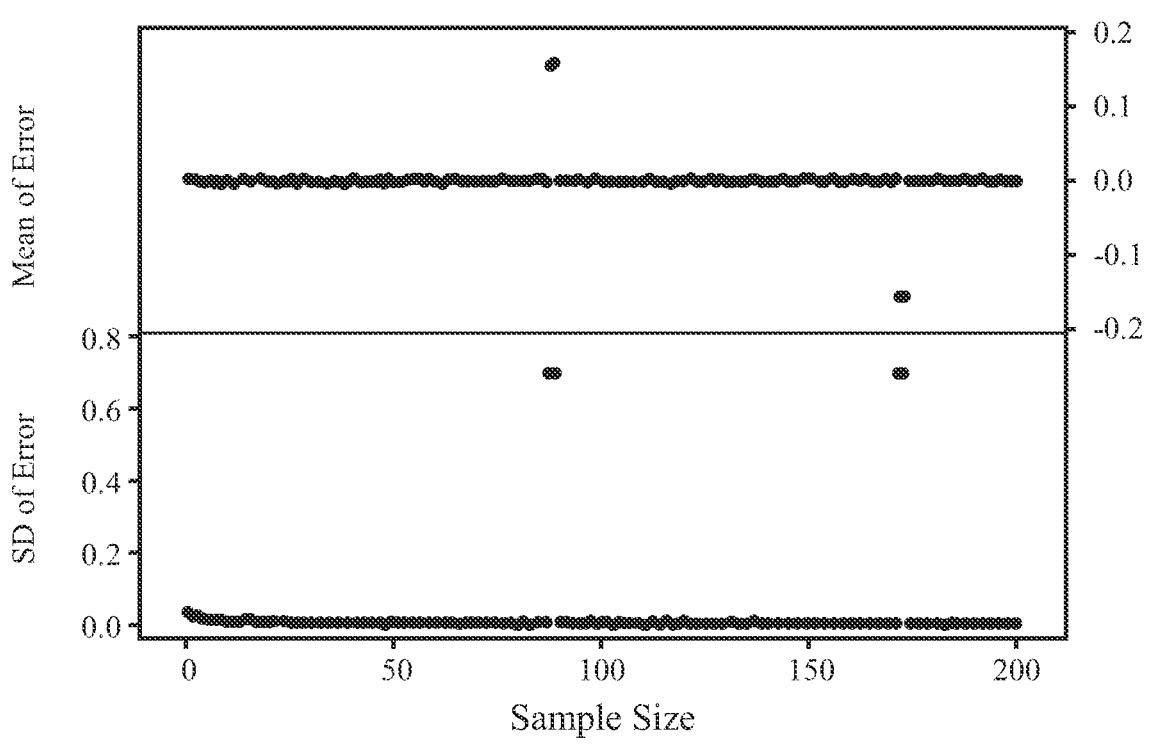
FIG. 12 shows changes in mean and standard deviation of angular errors with different sample size (data at sample size of 88, 89, 172 and 173 are outliers)

Table 5 shows that as the sample size increases, there is a decreasing trend in positional and angular errors, though the decrease is not strictly monotone. To get a more detailed picture, an additional set of experiments was performed with increasing sample sizes from 1 to 200 while keeping other settings unchanged. The mean and standard deviation of the errors in distance and angle was obtained, as presented in FIG. 11 and FIG. 12. FIG. 11 shows that the error in distance is strongly influenced by the number of samples when the number of samples is less than 50; beyond 50, the variation gradually flattens out. FIG. 12 shows that the error in angle hardly varies with the number of samples, except for a few outliers, the mean value is within ±0.001 and the standard deviation is within 0.01, for a sample size over 10. In practice, the optimized number of samples can be chose to achieve the desired accuracy based on the relationship between the error in distance and the sample size.

TABLE 5

Differences between the estimate and true values in $x^{DC}$, $y^{DC}$ and $\theta$ under different sample sizes, for a quadcopter setup.

| \|S\| | $\overline{x_b^{DC*}} - \overline{x_b^{DC}}$ | $\overline{y_b^{DC*}} - \overline{y_b^{DC}}$ | $\overline{\theta_b^{DC*}} - \overline{\theta_b^{DC}}$ |
|---|---|---|---|
| 50 | 0.00435 | 0.02070 | 0.00045 |
| 100 | −0.00400 | −0.00880 | 0.001 |
| 150 | 0.00415 | −0.00125 | 0.0003 |
| 200 | −0.00300 | −0.00595 | 0.00025 |
| 250 | −0.00190 | 0.00435 | 0.0000 |
| 300 | 0.00150 | −0.00430 | 0.0005 |

B. Experiments on a Real Drone Platform

1) Material and Apparatus

In this experiment, the weight change of the scale system was measured in different status, and obtaining the center of gravity of the drone and propellers' positions using Algorithm 1 and Algorithm 2.

As shown in FIG. 13, four digital load cells were placed beneath the platform to take measurements. Each load cell includes 1 TAL220 10 kg load cell 102, 1 SparkFun Open-Scale microcontroller 104, and a wooden base 106. A USB hub parallel-connected the four scales sets to a personal computer (PC) (not shown) for synchronized data collection. The platform was made by a 23¾"=23¾" polystyrene louver, of dimension 603.25 mm=603.25 mm×12.8 mm. Each hole of the platform is 12.55 mm×12.55 mm, and the slat between each adjacent two holes is 1.65 mm in width.

The platform 100 and the quadcopter 200 used in the experiment are shown in FIG. 1. The load cells used in these experiments are strain gauge load cells, which are capable of accurately measuring small changes in weight with one-gram. The microcontroller connected to each load cell is able to send the instantaneous load cell reading to the PC every 200 ms. The quadcopter structure was made of 3D printed parts and carbon fiber square tubes. For the quadcopter, four 2212/920 kV brushless motors were used, each connected to an Simonk 30A Firmware Brushless ESC. The propellers were DJI 9450, and the battery was a 5000 mAh 4-cell LiPo battery pack.

2) Procedure Outline

Before the test process, microcontrollers' baud rate was set to 11520 bps, set board report interval to 200 ms, vary the output of each propeller (8%-60%), and set spin time for each propeller to 5 seconds during the motor test. During the test process, all load cells were first tared to zero, the platform set onto the load cell system, and the initial readings obtained. This step, mentioned in Algorithm 2 lines 1 to 7, is for obtaining the weight of the platform. Afterwards, the drone was put onto the platform at a location marked before the process, and obtain the new readings. These readings were used for obtaining the center of gravity and weight of the drone by the steps described in lines 8 to 11 in the Algorithm 2 and the method in Algorithm 1. Finally, the propellers were spun in sequence and the readings were recorded. The readings were used for obtaining the position and force of all propellers by steps described in Algorithm 2 in lines 12 to 19. The action commands were sent to the drone by the Mission Planner software through a direct USB data link.

Motor output intensity and duration, drone position, and propeller with different damage situations were varied, and experiment results recorded below.

3) Results and Analysis

Table 6 and Table 7 show the errors between the translation obtained by the model and the actual translation for different motor outputs (30%, 40% and 50%) in the experimental results, respectively. The experiment was repeated by different $\alpha_i$ settings.

Figure 14:
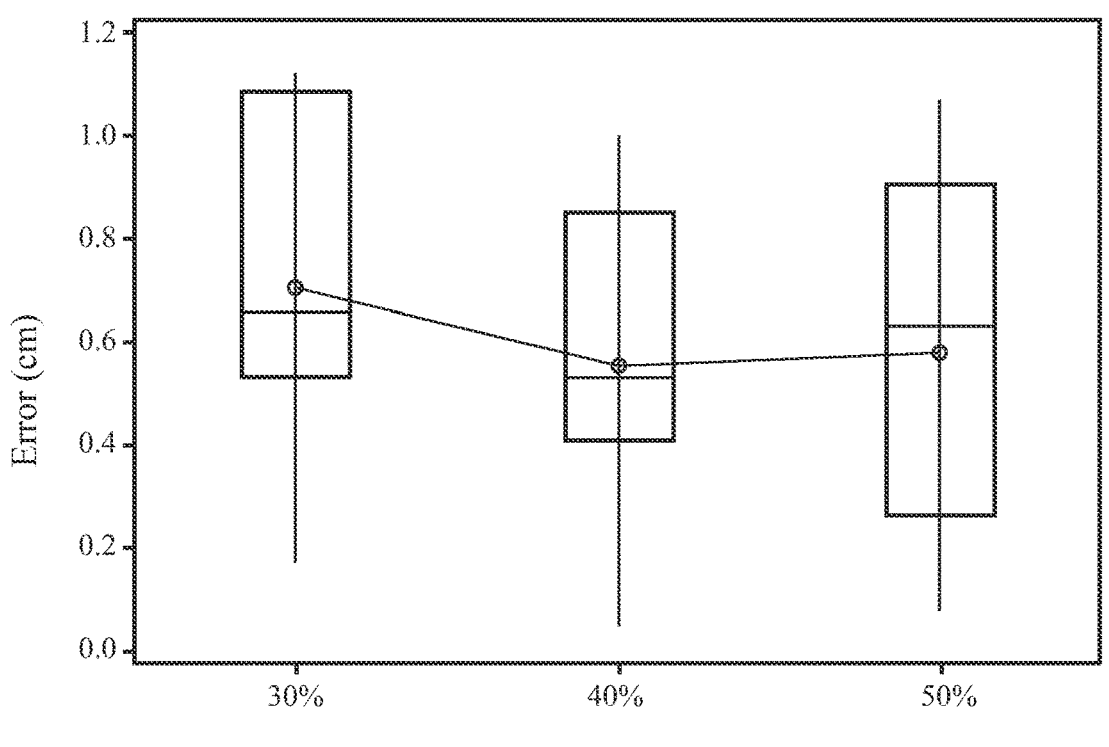
FIG. 14 shows a box plot of translational errors for motor output 30%, 40% and 50%.
Figure 15:
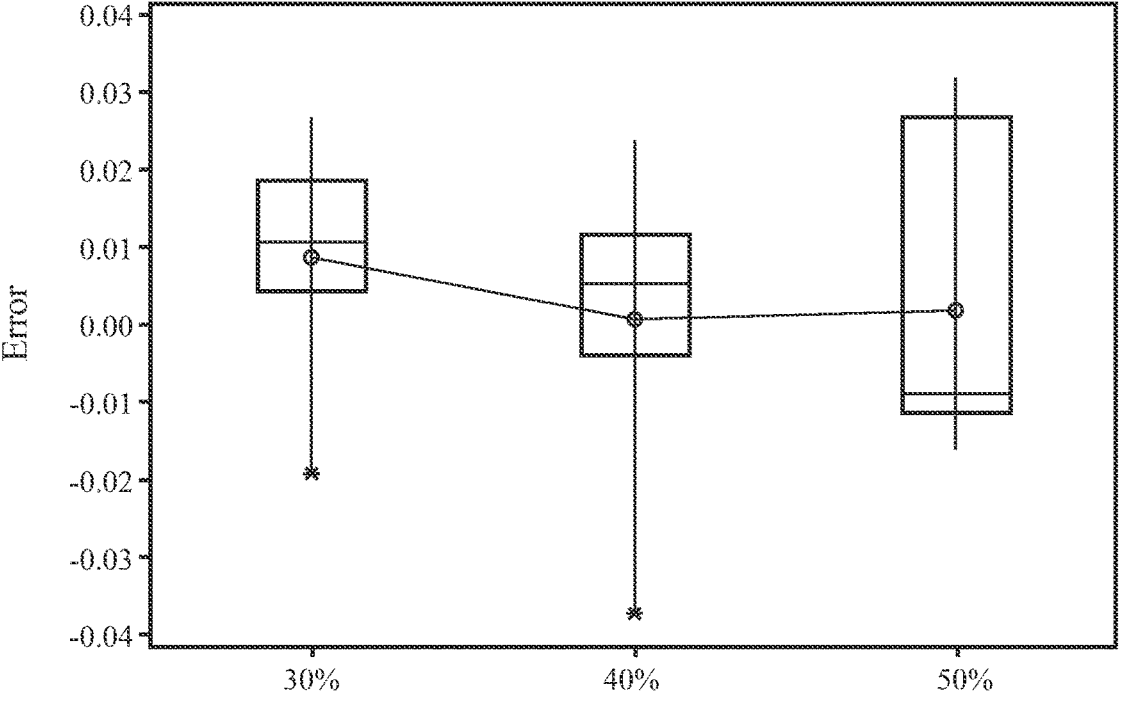
FIG. 15 shows a box plot of rotational errors for motor output 30%, 40% and 50%. The points "*" represent outliers.

The box plots (FIG. 14 and FIG. 15) show the average values of translational and rotational errors for different motor output conditions, respectively. The whiskers show extreme values of the results. The plots show both translational error and rotational error are lower when the motor output is 40%. This finding can be used in future practice to make the detection results more accurate by selecting the appropriate motor output in the testing procedure. For instance, for the quadcopter used in these experiments, 40% output level has been the most suitable.

TABLE 6

| Positional error (in cm) under different levels of motor output. | | | |
|---|---|---|---|
| $\alpha_1$ | 30% | 40% | 50% |
| 75° | 0.596699 | 0.53131 | 0.631875 |
| 65° | 0.655857 | 0.854029 | 0.078339 |
| 55° | 0.785938 | 0.486837 | 0.635852 |
| 45° | 0.532857 | 0.136682 | 0.262011 |
| 35° | 1.085765 | 0.848124 | 0.904991 |
| 25° | 0.167048 | 0.406762 | 0.462044 |
| 15° | 1.117856 | 0.613113 | 1.07332 |

TABLE 7

| Angular error (in rad) under different levels of motor output. | | | |
|---|---|---|---|
| $\alpha_1$ | 30% | 40% | 50% |
| 75° | 0.004662 | 0.011662 | −0.01134 |
| 65° | −0.01893 | −0.03693 | 0.01593 |
| 55° | 0.00529 | −0.00371 | 0.00129 |
| 45° | 0.018565 | 0.005205 | −0.00879 |
| 35° | 0.010835 | −0.00217 | 0.031835 |
| 25° | 0.026821 | 0.023821 | 0.026821 |
| 15° | 0.014041 | 0.006041 | −0.01096 |

4) Damaged Propeller Tests

Figure 18:
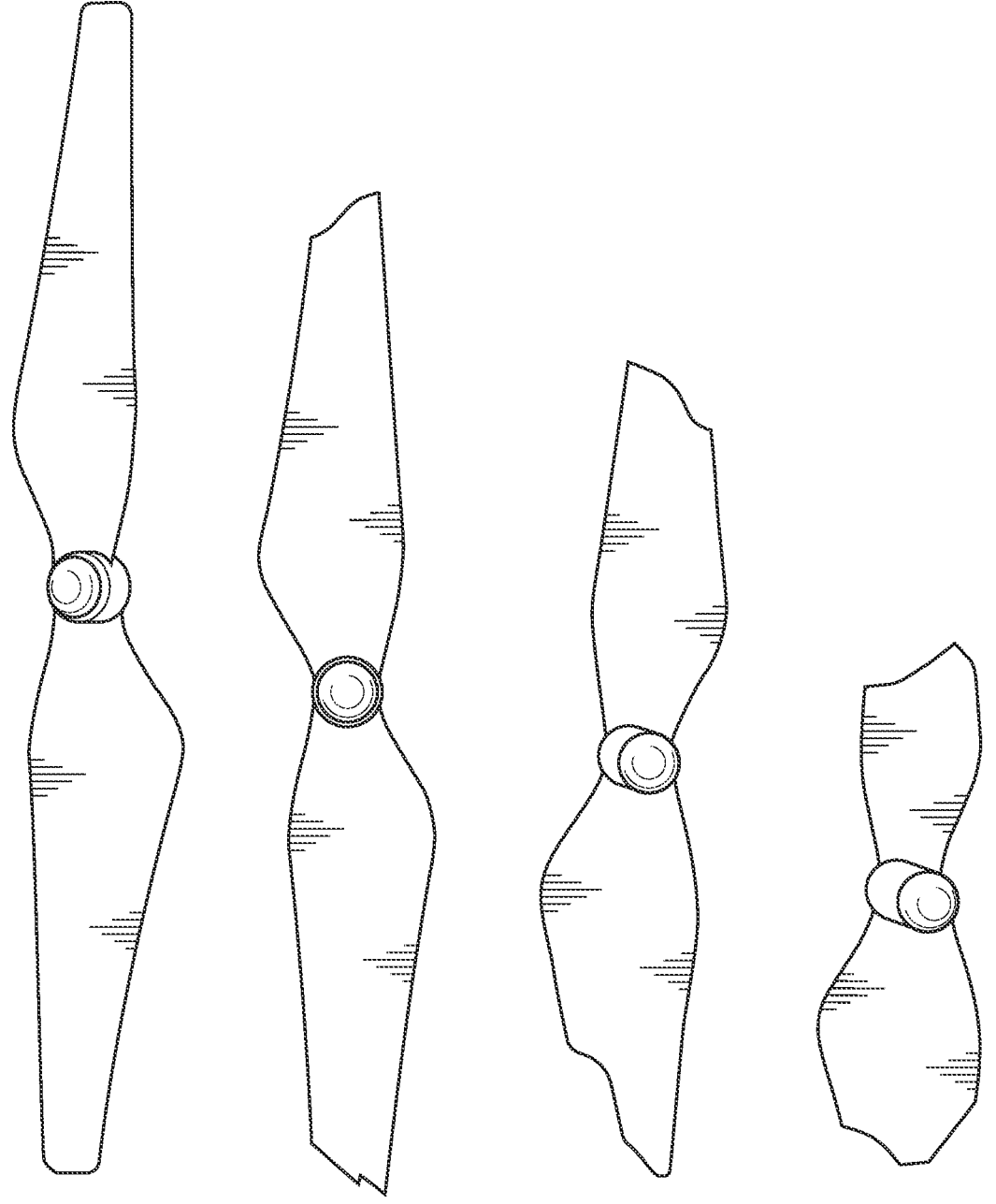
FIG. 18 shows an intact propeller juxtaposed with broken ones with 15%, 31% and 55% broken area.
Figures 19, 20:
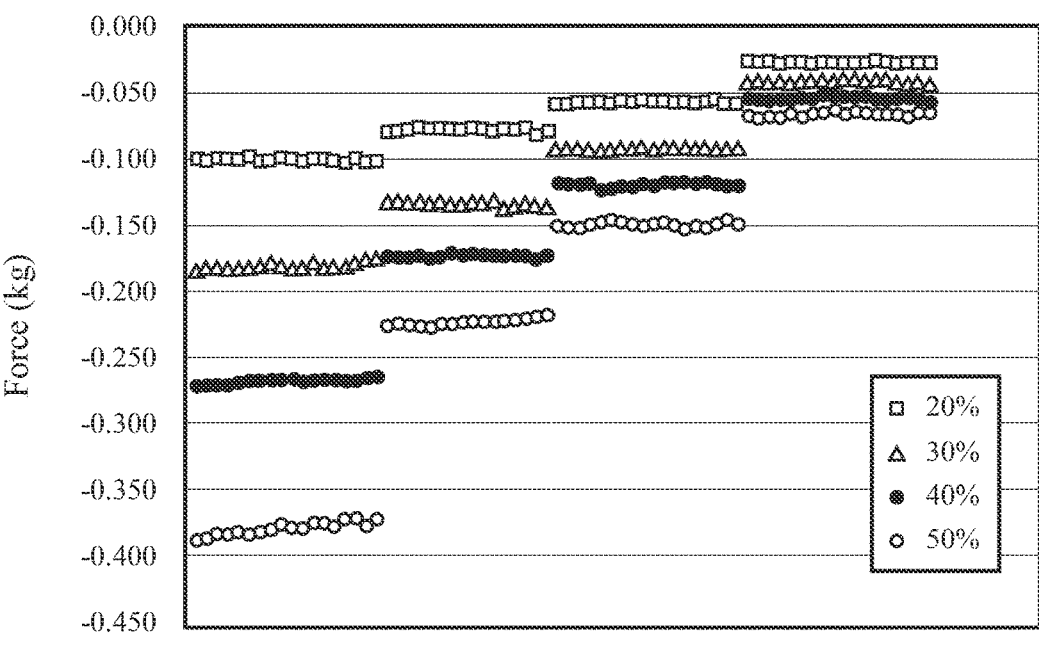
FIG. 19 shows propellers thrust with 0%, 15%, 31% and 55% blade broken at 20%, 30%, 40% and 50% motor outputs.
FIG. 20 shows position inference results for damaged propellers on a quadcopter drone. Propeller damage level clockwise from the top right corner: 55%, 15%, 31% and 0% (intact). Other experimental settings: motor output 40%, rotation 0°, sample size 14, $x^{DC}$=0:629, $y^{DC}$=1:246, θ=0: 010=0.6°. Result summary: translational error is 1.56 cm and rotational error is −0.0096 rad.)

Field tests were performed using a set of damaged propellers having damage levels of 0%, 15%, 31% and 55% as shown in FIG. 18. From the experimental results in FIG. 20, it can be seen that although the propellers are damaged to a large extent, the method is still able to obtain the precise position and the geometric center of the quadcopter. FIG. 19 shows output force for each propeller condition. Each successive aggregated points represents a collection of weight reduction values (output force) over a period of time for a given motor output condition for that propeller. By comparing the measured values of the output force against what is expected for an intact propeller, the algorithm is able to identify the damaged propellers and estimate the degree of damage.

IV

Figure 22:
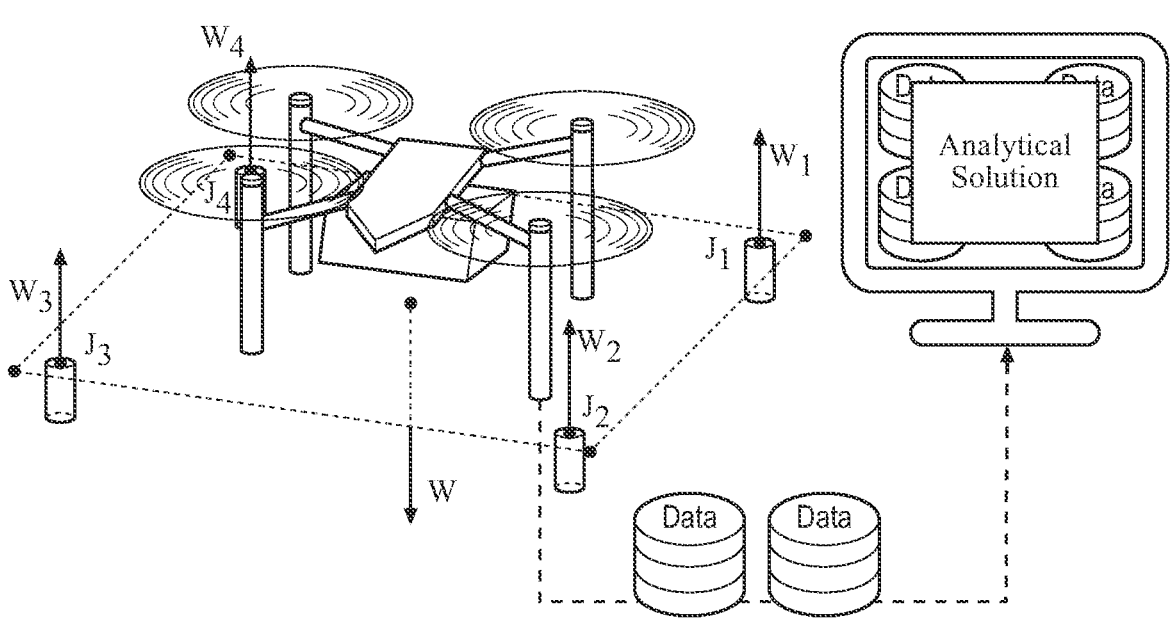
FIG. 22 shows a schematic of a quadcopter landed on a smart landing platform according to an embodiment of the present invention.

FIG. 22 provides a schematic view of a smart landing platform according to the embodiments of the present invention. A quadcopter is landed on a top surface of the platform. The platform is a flat surface supported by four digital load cells J1, J2, J3 and J4. In this example, the platform is a rectangular shape. The load cells are each located at one corner of the bottom of the rectangular platform such that the four load cells form a rectangle which geometrical center overlaps with the geometrical center of the rectangular platform. When the quadcopter is landed on the platform, the system is in an equilibrium state such that the downward force W equals to the sum of the load cell readings W1, W2, W3 and W4. The load cell readings are collected periodically and the measurement data are sent to a computer for processing.

Figure 23:
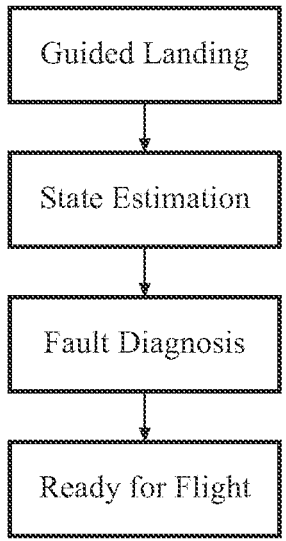
FIG. 23 shows a flowchart of how a smart landing platform can be used for multicopters and vertical take-off and landing (VTOL) vehicles.

A smart landing platform according to embodiments of the present invention can provide guidance when the platform is ready for landing, provide estimation of the states which the drones or the platform are in, such as when there is no drone on the platform, or when a drone is landed on the platform with the propellers not spinning, or when a drone is landed on the platform with one or more of the propellers spinning. The present smart landing platform can also provide fault diagnosis such as damaged propellers, payload imbalance, and/or motor malfunction by comparing the measured values of the output force against what is expected for an intact propeller or by evaluating whether the center of gravity of the drone is aligned with the geometric center of the drone. The present smart landing platform can also provide information signalling when there is no fault being detected and the drone is ready for flight. FIG. 23 is a flowchart showing the functions of the present smart landing platform.

The present invention provides methods for automatically performing safety checks for multicopter drones to support unmanned deployment of drones in various application domains. The challenge involved acquisition and fusion of the multicopter status data with weight measurement data from a smart landing platform. To detect component anomalies, a nonlinear least squares model is included in methods according to aspects of the present invention to estimate the amount of translation and rotation of the multicopter's airframe with respect to the nominal values. Based on the properties of the model, the analytical formula for its solution was derived and the uniqueness of the solution was proved. Simulation results have validated the superiority of the analytical approach over numerical solvers in solution time, particularly for problem instances with large sample sizes. The experiments conducted on real drone platforms have verified the robustness and the practical value of the proposed approach.

V. APPENDICES

A. Details of Calculation in Each Status k

Given different status k:

$$\mathcal{F}_{-1}(w_{jt}) = \left( x_t^{LCG}, y_t^{LCG}, W_t^L \right), \forall t \in \mathcal{T}_{-1} \tag{14}$$

$$W_t^L = \sum_{j \in \mathcal{J}} w_{jt}, \forall t \in \mathcal{T}_{-1} \tag{15}$$

$$x_t^{LCG} = \frac{1}{W_t^L} \sum_{j \in \mathcal{J}} w_{jt} x_j^S, \forall t \in \mathcal{T}_{-1} \tag{16}$$

$$y_t^{LCG} = \frac{1}{W_t^L} \sum_{j \in \mathcal{J}} w_{jt} y_j^S, \forall t \in \mathcal{T}_{-1} \tag{17}$$

To obtain $W^L$, $x^{LCG}$, $y^{LCG}$ and $M_{-1}$:

$$W^L = \frac{1}{|\mathcal{T}_{-1}|} \sum_{j \in \mathcal{J}, t \in \mathcal{T}_{-1}} w_{jt} \tag{18}$$

$$x^{LCG} = \frac{1}{W^L |\mathcal{T}_{-1}|} \sum_{j \in \mathcal{J}, t \in \mathcal{T}_{-1}} w_{jt} x_j^S \tag{19}$$

$$y^{LCG} = \frac{1}{W^L |\mathcal{T}_{-1}|} \sum_{j \in \mathcal{J}, t \in \mathcal{T}_{-1}} w_{jt} y_j^S \tag{20}$$

$$M_{-1} = W^L P^{LCG} \tag{21}$$

$$\mathcal{F}_0(w_{jt}) = \left( x_t^{DCG}, y_t^{DCG}, W_t^D \right), \forall t \in \mathcal{T}_0 \tag{22}$$

$$W_t^D = \sum_{j \in \mathcal{J}} w_{jt} - W^L, \forall t \in \mathcal{T}_0 \tag{23}$$

$$x_t^{DCG} = \frac{1}{W_t^D} \left( \sum_{j \in \mathcal{J}} w_{jt} x_j^S - W^L x^{LCG} \right), \forall t \in \mathcal{T}_0 \tag{24}$$

-continued $$y_t^{DCG} = \frac{1}{W_t^D}\left(\sum_{j\in\mathcal{J}} w_{jt}y_j^S - W^L y^{LCG}\right), \forall t \in \mathcal{T}_0 \tag{25}$$

To obtain $W^D$, $x^{DCG}$, $y^{DCG}$ and $M_0$:

$$W^D = \frac{1}{|\mathcal{T}_0|}\sum_{j\in\mathcal{J}, t\in\mathcal{T}_0} w_{jt} - W^L \tag{26}$$

$$x^{DCG} = \frac{1}{W^D|\mathcal{T}_0|}\left(\sum_{j\in\mathcal{J}, t\in\mathcal{T}_0} w_{jt}x_j^S - W^L x^{LCG}\right) \tag{27}$$

$$y^{DCG} = \frac{1}{W^D|\mathcal{T}_0|}\left(\sum_{j\in\mathcal{J}, t\in\mathcal{T}_0} w_{jt}y_j^S - W^L y^{LCG}\right) \tag{28}$$

$$M_0 = W^D P^{DCG} \tag{29}$$

$$\mathcal{F}_i(w_{jt}) = \left(x_{it}^{IS}, y_{it}^{IS}, F_{it}\right), \forall t \in \mathcal{T}_i \tag{30}$$

$$F_{it} = \sum_{j\in\mathcal{J}} w_{jt} - W^L - W^D, \forall t \in \mathcal{T}_i \tag{31}$$

$$x_{it}^{IS} = \frac{1}{F_{it}}\left(\sum_{j\in\mathcal{J}} w_{jt}x_j^S - W^L x^{LCG} - W^D x^{DCG}\right), \forall t \in \mathcal{T}_i \tag{32}$$

$$y_{it}^{IS} = \frac{1}{F_{it}}\left(\sum_{j\in\mathcal{J}} w_{jt}y_j^S - W^L y^{LCG} - W^D x^{DCG}\right), \forall t \in \mathcal{T}_i \tag{33}$$

$$F_{it} = W^L + W^D - \sum_{j\in\mathcal{J},} w_{jt}, \forall t \in \mathcal{T}_i \tag{34}$$

$$x_{it}^{IS} = \frac{1}{F_{it}}\left(W^L x^{LCG} + W^D x^{DCG} - \sum_{j\in\mathcal{J}} w_{js}\right), \forall s \in \mathcal{T}_i \tag{35}$$

$$y_{it}^{IS} = \frac{1}{F_{it}}\left(W^L y^{LCG} + W^D y^{DCG} - \sum_{j\in\mathcal{J}} w_{js}\right), \forall s \in \mathcal{T}_i \tag{36}$$

B. Proof of Proposition 1

To prove, it is only needed to show that the optimal solution is a minimum point for equation (2) in the given domain. Take the derivative of equation (2), to get $$\frac{\partial f_1}{\partial x^{DC}} = 4|S|x^{DC} - 2\sum_s\left(x_{1s}^{IS} + x_{1s}'^{IS}\right) \tag{37}$$

$$\frac{\partial f_1}{\partial y^{DC}} = 4|S|y^{DC} - 2\sum_s\left(y_{1s}^{IS} + y_{1s}'^{IS}\right) \tag{38}$$

$$\frac{\partial f_1}{\partial\theta} = 2l_1\sum_s\left(x_{1s}^{IS} - x_{1s}'^{IS}\right)\sin(\alpha+\theta) + 2l_1\sum_s\left(y_{1s}'^{IS} - y_{1s}^{IS}\right)\cos(\alpha+\theta) \tag{39}$$

Define a: $=\Sigma_s\,(x_{1s}^{IS}-x'_{1s}{}^{IS})$, b:$=-\Sigma_s\,(y'_{1s}{}^{IS}-y_{1s}{}^{IS})$, $$A := \frac{a}{\sqrt{a^2+b^2}} = \cos\gamma$$

and $$B := \frac{b}{\sqrt{a^2+b^2}} = \sin\gamma$$

to get $$\frac{\partial f_1}{\partial\theta} = 2l_1(a\sin(\theta+\alpha) - b\cos(\theta+\alpha)) = \tag{40}$$
$$2l_1\sqrt{a^2+b^2}\,(A\sin(\theta+\alpha) - B\cos(\theta+\alpha)) =$$
$$2l_1\sqrt{a^2+b^2}\,(\cos\gamma\sin(\theta+\alpha) - \sin\gamma\cos(\theta+\alpha)) =$$
$$2l_1\sqrt{a^2+b^2}\,\sin(\theta+\alpha-\gamma)$$

Let $$\frac{\partial f_1}{\partial\theta} = 0,$$

to obtain $\sin(\theta+\alpha-\gamma)=0\Rightarrow\theta^*+\alpha-\gamma n\pi$.

Let $\gamma$ be the angle between the arm and the x-axis after rotating an angle of $\theta$ from the initial position $\alpha$, then according to FIGS. 21A and 21B, $$\gamma = \frac{b}{\sqrt{b^2}}\arccos\frac{a}{\sqrt{a^2+b^2}} \tag{41}$$

when b=0, $$\gamma = \arccos\frac{a}{\sqrt{a^2+b^2}} \tag{42}$$

Given $\theta^*=n\pi-\alpha+\gamma$ $$\theta^* = \begin{cases} n\pi - \alpha + \dfrac{b}{\sqrt{b^2}}\arccos\dfrac{a}{\sqrt{a^2+b^2}} & b\neq 0 \\[2ex] n\pi - \alpha + \arccos\dfrac{a}{\sqrt{a^2+b^2}} & b = 0 \end{cases}$$

Take the second derivative of equation (38), to get $$\frac{\partial^2 f_1}{\partial\theta^2} = \sqrt{a^2+b^2}\,(\cos\gamma\cos(\theta+\alpha) + \sin\gamma\sin(\theta+\alpha)) \tag{43}$$

Substitute $\theta^*$ for $\theta$ in the equation, to obtain:

$$\frac{\partial^2 f_1}{\partial\theta^2} = 2l_1\sqrt{a^2+b^2}\,(\cos\gamma\cos(n\pi+\gamma) + \sin\gamma\sin(n\pi+\gamma)) = \tag{44}$$
$$2l_1\sqrt{a^2+b^2}\left(\begin{array}{l}\cos\gamma(\cos(n\pi)\cos\gamma - \sin(n\pi)\sin\gamma) + \\ \sin\gamma(\sin(n\pi)\cos\gamma + \cos(n\pi)\sin\gamma)\end{array}\right) =$$
$$2l_1\sqrt{a^2+b^2}\,(\cos(n\pi)(\cos^2\gamma + \sin^2\gamma)) = 2l_1\sqrt{a^2+b^2}\,\cos(n\pi)$$

When $$n = 0, 2, 4\ldots, \frac{\partial^2 f_1}{\partial\theta^2} > 0.$$

Here n=0 is selected arbitrarily.

Let the derivatives $$\frac{\partial f_1}{\partial x^{DC}} \text{ and } \frac{\partial f_1}{\partial y^{DC}}$$

in equations (36) and (37), respectively, be zero. The following is obtained:

$$\begin{cases} x^{DC*} = \sum_s \left(x_{1s}^{IS} + x_{1s}^{\prime IS}\right)/2|S| \\ y^{DC*} = \sum_s \left(y_{1s}^{IS} + y_{1s}^{\prime IS}\right)/2|S| \end{cases}$$

Also:

$$\frac{\partial^2 f_1}{\partial \left(x^{DC}\right)^2} = 4|S|$$

$$\frac{\partial^2 f_1}{\partial \left(y^{DC}\right)^2} = 4|S|$$

$$\text{and } \frac{\partial^2 f_1}{\partial x^{DC} \partial y^{DC}} = \frac{\partial^2 f_1}{\partial y^{DC} \partial x^{DC}} = 0,$$

$$\frac{\partial^2 f_1}{\partial x^{DC} \partial \theta} = \frac{\partial^2 f_1}{\partial \theta \partial x^{DC}} = 0, \frac{\partial^2 f_1}{\partial y^{DC} \partial \theta} = \frac{\partial^2 f_1}{\partial \theta \partial y^{DC}} = 0.$$

Define $H_{f1}$ the Hessian matrix H of function $f_1(x^{DC}, y^{DC}, \theta)$, $$H_{f1} = \begin{bmatrix} \dfrac{\partial^2 f_1}{\partial \left(x^{DC}\right)^2} & \dfrac{\partial^2 f_1}{\partial x^{DC} \partial y^{DC}} & \dfrac{\partial^2 f_1}{\partial x^{DC} \partial \theta} \\ \dfrac{\partial^2 f_1}{\partial y^{DC} \partial x^{DC}} & \dfrac{\partial^2 f_1}{\partial \left(y^{DC}\right)^2} & \dfrac{\partial^2 f_1}{\partial y^{DC} \partial \theta} \\ \dfrac{\partial^2 f_1}{\partial \theta \partial x^{DC}} & \dfrac{\partial^2 f_1}{\partial \theta \partial y^{DC}} & \dfrac{\partial^2 f_1}{\partial \theta^2} \end{bmatrix}$$

and the leading principal minors of $H_{f1}$ at $(x^{DC*}, y^{DC*}, \theta*)$:

$$H_1 = \left| \frac{\partial^2 f_1}{\partial \left(x^{DC}\right)^2} \right| = 4|S| > 0$$

$$H_2 = \begin{vmatrix} \dfrac{\partial^2 f_1}{\partial \left(x^{DC}\right)^2} & \dfrac{\partial^2 f_1}{\partial x^{DC} \partial y^{DC}} \\ \dfrac{\partial^2 f_1}{\partial y^{DC} \partial x^{DC}} & \dfrac{\partial^2 f_1}{\partial \left(y^{DC}\right)^2} \\ \dfrac{\partial^2 f_1}{\partial \theta \partial x^{DC}} & \dfrac{\partial^2 f_1}{\partial \theta \partial y^{DC}} \end{vmatrix} = 16|S|^2 > 0$$

$$H_3 = \begin{vmatrix} \dfrac{\partial^2 f_1}{\partial \left(x^{DC}\right)^2} & \dfrac{\partial^2 f_1}{\partial x^{DC} \partial y^{DC}} & \dfrac{\partial^2 f_1}{\partial x^{DC} \partial \theta} \\ \dfrac{\partial^2 f_1}{\partial y^{DC} \partial x^{DC}} & \dfrac{\partial^2 f_1}{\partial \left(y^{DC}\right)^2} & \dfrac{\partial^2 f_1}{\partial y^{DC} \partial \theta} \\ \dfrac{\partial^2 f_1}{\partial \theta \partial x^{DC}} & \dfrac{\partial^2 f_1}{\partial \theta \partial y^{DC}} & \dfrac{\partial^2 f_1}{\partial \theta^2} \end{vmatrix} = 16|S|^2 2l_1 \sqrt{a^2 + b^2} > 0$$

So $(x^{DC*}, y^{DC*}, \theta*)$ is a local minimum point for $f_1(x^{DC}, y^{DC}, \theta)$.

C. Proof of Proposition 2

Similarly, define $a_i = \Sigma_s \ (x_{is}^{IS} - x_{is}^{\prime IS})$ and $b_i = -\Sigma_s \ (y_{is}^{\prime IS} - y_{is}^{IS})$ and $$\gamma_i = \frac{b_i}{\sqrt{b_i^2}} \arccos \frac{a_i}{\sqrt{a_i^2 + b_i^2}} \tag{45}$$

when $b_i = 0$, $$\gamma_i = \arccos \frac{a_i}{\sqrt{a_i^2 + b_i^2}} \tag{46}$$

The partial derivatives are:

$$\frac{\partial f}{\partial x^{DC}} = 4|I||S|x^{DC} - 2\sum_i \sum_s \left(x_{is}^{IS} + x_{is}^{\prime IS}\right) \tag{47}$$

$$\frac{\partial f}{\partial y^{DC}} = 4|I||S|y^{DC} - 2\sum_i \sum_s \left(y_{is}^{IS} + y_{is}^{\prime IS}\right) \tag{48}$$

$$\frac{\partial f}{\partial \theta} = \sum_i \left(2l_i \sqrt{a_i^2 + b_i^2} \sin(\theta + \alpha_i - \gamma_i)\right) \tag{49}$$

let $$\frac{\partial f}{\partial \theta} = 0$$

to obtain $\theta* = n\pi - \beta_i$

From equation (48):

$$\frac{\partial^2 f}{\partial \theta^2} = \sum_{i=1}^{I} \left(\sqrt{a_i^2 + b_i^2} \cos(\theta + \alpha_i - \gamma_i)\right) \tag{50}$$

and using $A_i$, $\beta_i$, $B_i$, $\mu_i$ to substitute terms in the equation:

$$\frac{\partial^2 f}{\partial \theta^2} = \tag{51}$$

$$A_1 \cos(\theta + \beta_1) + B_1 \cos(\theta + \mu_1) + \sum_{i=3}^{I} \left(\sqrt{a_i^2 + b_i^2} \cos(\theta + \alpha_i - \gamma_i)\right) =$$

$$\sqrt{(A_1 \cos\beta_1 + B_1 \cos\mu_1)^2 + (A_1 \sin\beta_1 + B_1 \sin\mu_1)^2} \cos\left(\theta + \right.$$

$$\left. \arctan\left(\frac{A_1 \sin\beta_1 + B_1 \sin\mu_1}{A_1 \cos\beta_1 + B_1 \cos\mu_1}\right)\right) +$$

$$\sum_{i=3}^{I} \left(\sqrt{a_i^2 + b_i^2} \cos(\theta + \alpha_i - \gamma_i)\right) = A_2 \cos(\theta + \beta_2) + B_2 \cos(\theta + \mu_2) +$$

$$\sum_{i=4}^{I} \left(\sqrt{a_i^2 + b_i^2} \cos(\theta + \alpha_i - \gamma_i)\right) = \ldots = A_i \cos(\theta + \beta_i)$$

Substitute $\theta*$ for $\theta$ in the equation, to obtain:

$$\frac{\partial^2 f}{\partial \theta^2} = A_i \cos(n\pi - \beta_i + \beta_i) = A_i \cos n\pi \tag{52}$$

23

When n=0,2,4 . . . , $$\frac{\partial^2 f}{\partial \theta^2} > 0.$$

Similarly, n=0 is selected arbitrarily.
let $$\frac{\partial f}{\partial x^{DC}} = 0, \frac{\partial f}{\partial y^{DC}} = 0.$$

The following is obtained:

$$\begin{cases} x^{DC*} = \sum_i \sum_s (x_{1s}^{IS} + x_{1s}'^{IS})/(2I|S|) \\ y^{DC*} = \sum_i \sum_s (y_{1s}^{IS} + y_{1s}'^{IS})/(2I|S|) \\ \theta^* = n\pi - \beta_I \end{cases}$$

The second partial derivative of $x^{DC}$ and $y^{DC}$ is taken:

$$\frac{\partial^2 f}{\partial (x^{DC})^2} = 4|I||S| > 0$$

$$\frac{\partial^2 f}{\partial (y^{DC})^2} = 4|I||S| > 0$$

The proof that $(x^{DC*}, y^{DC*}, \theta^*)$ is a local minimum point for $f(x^{DC}, y^{DC}, \theta)$ in which $i \in \mathcal{I}$ is similar to the proof of i=1 condition.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

The invention claimed is:

1. A method of performing automated pre-flight safety check for a drone with propellers, the method comprising the steps of:
   providing a smart landing platform system including;
   a platform having a top side and a bottom side and for landing a drone on the top side, the platform having a geometrical center, a center of gravity and a weight;
   a digital scale disposed beneath the platform for providing measurements of a weight distribution of the platform and the drone; and
   a control unit communicatively connected to the digital scale for instantaneous data collection and storing logic including a statistical inference algorithm based on a nonlinear least squares model to perform an automated pre-flight safety check for the drone; measuring the weight of the platform in different statuses;
   estimating a weight change of the platform between the different statuses;
   estimating a force acting on the drone and positions of the propellers based on the estimated weight change of the platform between the different statuses using a nonlinear least squares model; and

automatedly performing the pre-flight safety check for the drone to determine anomalies based on the estimated force acting on the drone and positions of the propellers with respect to respective nominal values, wherein the anomalies include damaged propellers, payload imbalance, and/or motor malfunction.

2. The method according to claim 1, wherein the different statuses includes a first status being a stable status when the platform is placed on the load cells without the drone on the platform, a second status being a stable status when the drone is on the platform with the propellers not spinning, and a third status being a variable status corresponding to at least one of the propellers is spinning.

3. The method according to claim 2, wherein the third status is a variable status corresponding to when one of the propellers is spinning.

4. The method according to claim 1, wherein the position of each propeller includes a center point location and orientation of the propeller.

5. The method according to claim 1, wherein the anomalies are determined based on a principle of a resultant of all forces acting on the drone is zero when the drone is in equilibrium.

6. The method according to claim 1, wherein the damaged propellers are detected by comparing the measured values of the output force against what is expected for an intact propeller.

7. The method according to claim 1, wherein the damaged propellers are detected by evaluating whether the center of gravity of the drone is aligned with the geometric center of the drone.

8. The method according to claim 1, further comprising setting an initial load on each load cell to zero before putting the platform on the load cells.

9. The method according to claim 1, wherein the propellers located at vertices of a regular polygon have a center overlapping with the geometrical center of the platform.

10. The method according to claim 1, wherein the drone has a pair of propellers connected by a rigid arm.

11. The method according to claim 1, wherein the drone has a plurality of pairs of propellers, each pair of propellers connected by a rigid arm.

12. A system of integrated smart landing platforms, comprising:
   a plurality of smart landing platforms for a drone, wherein the plurality of smart landing platforms are distributed at a plurality of locations, and wherein each of the plurality of smart landing platforms comprises: a platform having a top side and a bottom side and for landing a drone on the top side, the platform having a geometrical center, a center of gravity and a weight;
   a digital scale disposed beneath the platform for providing measurements of a weight distribution of the platform and the drone; and
   a control unit communicatively connected to the digital scale for instantaneous data collection and storing logic including a statistical inference algorithm based on a nonlinear least squares model to perform automated pre-flight safety check for the drone.

13. The system of claim 12, wherein at least some of the plurality of smart landing platforms are located on rooftops of buildings.

14. The system of claim 12, further comprising one or more charging devices capable of powering one or more drones.

* * * * *